United States Patent
Wilkinson et al.

(10) Patent No.: US 11,537,127 B2
(45) Date of Patent: Dec. 27, 2022

(54) SYSTEMS AND METHODS FOR VEHICLE MOTION PLANNING BASED ON UNCERTAINTY

(71) Applicant: UATC, LLC, San Francisco, CA (US)

(72) Inventors: Eric Lloyd Wilkinson, San Francisco, CA (US); Michael Lee Phillips, Pittsburgh, PA (US); David Mcallister Bradley, Pittsburgh, PA (US); Zakary Warren Littlefield, Pittsburgh, PA (US); Aum Jadhav, San Francisco, CA (US); Utku Eren, Pittsburgh, PA (US); Samuel Philip Marden, Pittsburgh, PA (US); Colin Jeffrey Green, Pittsburgh, PA (US)

(73) Assignee: UATC, LLC, Mountain View, CA (US)

( * ) Notice: Subject to any disclaimer, the term of this patent is extended or adjusted under 35 U.S.C. 154(b) by 148 days.

(21) Appl. No.: 16/713,441

(22) Filed: Dec. 13, 2019

(65) Prior Publication Data
US 2021/0080955 A1  Mar. 18, 2021

Related U.S. Application Data
(60) Provisional application No. 62/899,226, filed on Sep. 12, 2019.

(51) Int. Cl.
| | | |
|---|---|---|
| G05D 1/00 | (2006.01) | |
| B60W 30/095 | (2012.01) | |
| G05D 1/02 | (2020.01) | |

(52) U.S. Cl.
CPC ....... *G05D 1/0088* (2013.01); *B60W 30/0956* (2013.01); *G05D 1/0214* (2013.01);
(Continued)

(58) Field of Classification Search
CPC .. G05D 1/0088; G05D 1/0214; G05D 1/0221; G05D 2201/0213; B60W 30/0956; B60W 2520/12
See application file for complete search history.

(56) References Cited

U.S. PATENT DOCUMENTS
| | | | |
|---|---|---|---|
| 9,969,386 B1 * | 5/2018 | Wang | B62D 15/0285 |
| 11,242,050 B2 * | 2/2022 | Bouton | G08G 1/0129 |

(Continued)

FOREIGN PATENT DOCUMENTS
| | | | |
|---|---|---|---|
| CN | 109901574 B | * | 8/2021 |

OTHER PUBLICATIONS
International Search Report and Written Opinion for Application No. PCT/US2020/049373, dated Dec. 8, 2020, 11 pages.
(Continued)

*Primary Examiner* — Frederick M Brushaber
*Assistant Examiner* — Elizabeth Yang
(74) *Attorney, Agent, or Firm* — Dority & Manning, P.A.

(57) ABSTRACT

Systems and methods for vehicle motion planning based on uncertainty are provided. A method can include obtaining scene data descriptive of one or more objects within a surrounding environment of the autonomous vehicle. The method can include determining one or more subproblems based at least in part on the scene data. In some implementation, each of the one or more subproblems can correspond to at least one object within the surrounding environment of the autonomous vehicle. The method can include generating one or more branching policies based at least in part on the one or more subproblems. In some implementations, each of the one or more branching policies can include scene data associated with the autonomous vehicle and one or more objects within the surrounding environment of the autonomous vehicle. The method can include determining one or
(Continued)

more costs associated each of the one or more branching policies. The method can include selecting a motion plan based at least in part on the one or more costs associated with each of the one or more branching policies. The method can include providing the motion plan for use in controlling a motion of the autonomous vehicle.

17 Claims, 8 Drawing Sheets

(52) U.S. Cl.
 CPC ....... *G05D 1/0221* (2013.01); *B60W 2520/12* (2013.01); *G05D 2201/0213* (2013.01)

(56) References Cited

U.S. PATENT DOCUMENTS

| | | | | |
|---|---|---|---|---|
| 2015/0266477 | A1* | 9/2015 | Schmudderich | B60W 40/04 701/98 |
| 2016/0016312 | A1* | 1/2016 | Lawrence, III | G01B 11/24 901/41 |
| 2019/0152490 | A1 | 5/2019 | Lan et al. | |
| 2020/0050214 | A1* | 2/2020 | Goehl | G06K 9/00805 |
| 2020/0363800 | A1* | 11/2020 | Jojo-Verge | G05D 1/0212 |
| 2021/0094577 | A1* | 4/2021 | Shalev-Shwartz | G06V 20/58 |
| 2021/0316763 | A1* | 10/2021 | Domahidi | B62D 15/027 |

OTHER PUBLICATIONS

Aoude et al., "Probabilistically Safe Motion Planning to Avoid Dynamic Obstacles with Uncertain Motion Patterns", Autonomous Robots, vol. 35, 2013, 26 pages.
Bakker et al., "ACAS X—The Future of Airborne Collision Avoidance", Eurocontrol Netalert Newsletter, Jun. 2013, 10 pages.
Chen et al., "POMDP-lite for Robust Robot Planning under Uncertainty", arXiv:1602v2, Feb. 18, 2016, 9 pages.
Kurniawati et al., "SARSOP: Efficient Point-Based POMDP Planning by Approximating Optimally Reachable Belief Spaces", Robotics: Science and Systems, vol. 2008, 2008, 8 pages.
Pineau et al., "Point-Based Value Iteration: An Anytime Algorithm for POMDPs", vol. 3, 2003, 6 pages.
Shalev-Shwartz et al., "On a Formal Model of Safe and Scalable Self-driving Cars", arXiv:1708v6, Oct. 27, 2018, 37 pages.
Silver et al., "Monte-Carlo Planning in Large POMDPs", Advances in Neural Information Processing Systems, 2010, 9 pages.
Sunberg et al., "Online Algorithms for POMDPs with Continuous State, Action, and Observation Spaces", arXiv:1709v6, Sep. 6, 2018, 13 pages.
Todoran et al., "Just-in-Time Emergency Trajectories: A Formulation Towards Safety in Autonomous Navigation", International Conference on Intelligent Robots and Systems, 2018, 8 pages.
Wray et al., "Online Decision-Making for Scalable Autonomous Systems", Twenty-Sixth International Joint Conference on Artificial Intelligence, 2017, pp. 4768-4774.
Ye et al, "DESPOT: Online POMDP Planning with Regularization", Journal of Artificial Intelligence Research, vol. 58, 2017, 36 pages.
International Preliminary Report on Patentability for PCT/US2020/049373 dated Mar. 25, 2022, 7 pages.

* cited by examiner

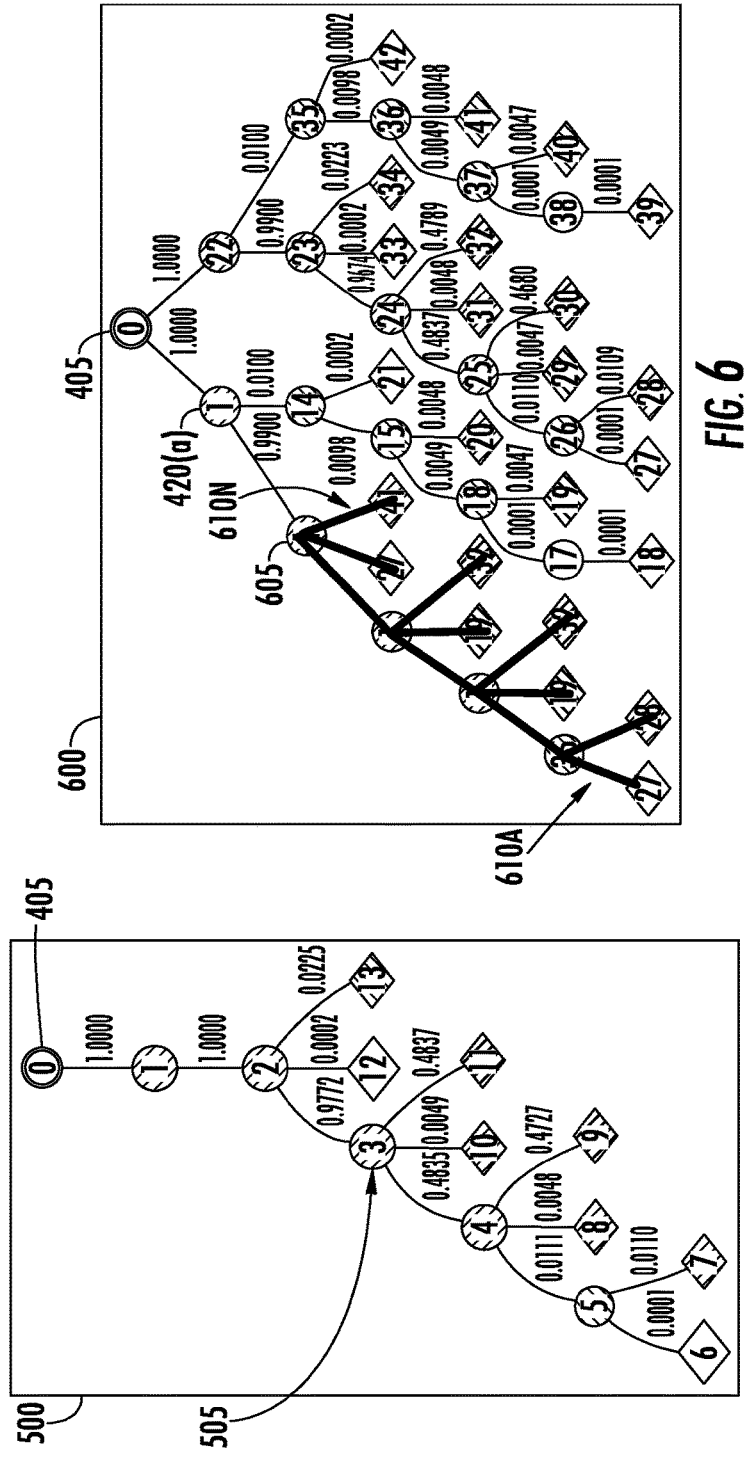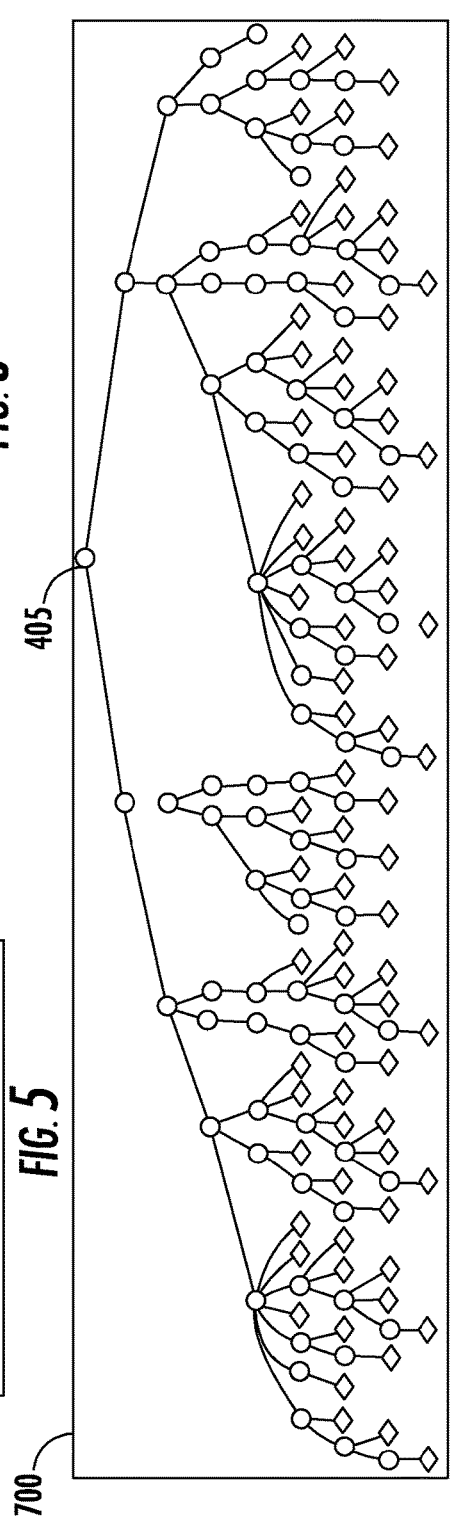

SYSTEMS AND METHODS FOR VEHICLE MOTION PLANNING BASED ON UNCERTAINTY

RELATED APPLICATION

The present application is based on and claims benefit of U.S. Provisional Patent Application No. 62/899,226 having a filing date of Sep. 12, 2019, which is incorporated by reference herein.

FIELD

The present disclosure relates generally to vehicle motion planning. In particular, a vehicle motion plan can be created based on state data associated with a vehicle and its surrounding objects.

BACKGROUND

An autonomous vehicle can be capable of sensing its environment and navigating with little to no human input. In particular, an autonomous vehicle can observe its surrounding environment using a variety of sensors and can attempt to comprehend the environment by performing various processing techniques on data collected by the sensors. Given knowledge of its surrounding environment, the autonomous vehicle can navigate through such surrounding environment.

SUMMARY

Aspects and advantages of embodiments of the present disclosure will be set forth in part in the following description, or may be learned from the description, or may be learned through practice of the embodiments.

One example aspect of the present disclosure is directed to a computer-implemented method for autonomous vehicle motion planning. The method includes obtaining, by a computing system comprising one or more computing devices onboard an autonomous vehicle, scene data descriptive of one or more objects within a surrounding environment of the autonomous vehicle. The method includes determining, by the computing system, one or more subproblems based at least in part on the scene data. Each of the one or more subproblems correspond to at least one object within the surrounding environment of the autonomous vehicle. The method includes generating, by the computing system, one or more branching policies based at least in part on the one or more subproblems. Each of the one or more branching policies include scene data associated with the autonomous vehicle and one or more objects within the surrounding environment of the autonomous vehicle. The method includes determining, by the computing system, one or more costs associated with each of the one or more branching policies. The method includes selecting, by the computing system, a motion plan based at least in part on the one or more costs associated with each of the one or more branching policies. And, the method includes providing, by the computing system, the motion plan for use in controlling a motion of the autonomous vehicle.

Another example aspect of the present disclosure is directed to a computing system including one or more processors; and one or more memories. The one or more memories include instructions that, when executed by the one or more processors, cause the one or more processors to perform operations. The operations include obtaining scene data descriptive of one or more objects within a surrounding environment of an autonomous vehicle. The operation also include determining one or more subproblems based at least in part on the scene data. Each of the one or more subproblems correspond to at least one object within the surrounding environment of the autonomous vehicle. The operations include identifying one or more travel decisions based at least in part on the scene data and the one or more subproblems. The operations include generating one or more branching policies for each of the one or more travel decisions. The operations include generating a motion plan based at least in part on the one or more branching policies for each of the one or more travel decisions. And, the operations include providing, by the computing system, the motion plan for use in controlling a motion of the autonomous vehicle.

Yet another example aspect of the present disclosure is directed to an autonomous vehicle. The autonomous vehicle includes one or more processors and one or more tangible, non-transitory, computer readable media that collectively store instructions that when executed by the one or more processors cause the one or more processors to perform operations. The operations include obtaining scene data descriptive of one or more objects within a surrounding environment of the autonomous vehicle. The operations also include determining one or more subproblems based at least in part on the scene data. Each of the one or more subproblems correspond to at least one object within the surrounding environment of the autonomous vehicle. The operations include generating one or more branching policies based at least in part on the one or more subproblems. Each of the one or more branching policies include one or more states associated with the autonomous vehicle or one or more objects in the surrounding environment of the autonomous vehicle. The operation include determining one or more costs associated with each of the one or more branching policies. The operations include selecting a motion plan based at least in part on the one or more costs associated with each of the one or more branching policies. And, the operations include providing the motion plan for use in controlling a motion of the autonomous vehicle.

Other example aspects of the present disclosure are directed to systems, methods, vehicles, apparatuses, tangible, non-transitory computer-readable media, and memory devices for controlling autonomous vehicles.

The autonomous vehicle technology described herein can help improve the safety of passengers of an autonomous vehicle, improve the safety of the surroundings of the autonomous vehicle, improve the experience of the rider and/or operator of the autonomous vehicle, as well as provide other improvements as described herein. Moreover, the autonomous vehicle technology of the present disclosure can help improve the ability of an autonomous vehicle to effectively provide vehicle services to others and support the various members of the community in which the autonomous vehicle is operating, including persons with reduced mobility and/or persons that are underserved by other transportation options. Additionally, the autonomous vehicle of the present disclosure may reduce traffic congestion in communities as well as provide alternate forms of transportation that may provide environmental benefits.

These and other features, aspects and advantages of various embodiments will become better understood with reference to the following description and appended claims. The accompanying drawings, which are incorporated in and constitute a part of this specification, illustrate embodiments of the present disclosure and, together with the description, serve to explain the related principles.

BRIEF DESCRIPTION OF THE DRAWINGS

Detailed discussion of embodiments directed to one of ordinary skill in the art are set forth in the specification, which makes reference to the appended figures, in which:

FIG. 5-7 depict exemplary branching policies with time based decision points.

DETAILED DESCRIPTION

Figure 1:
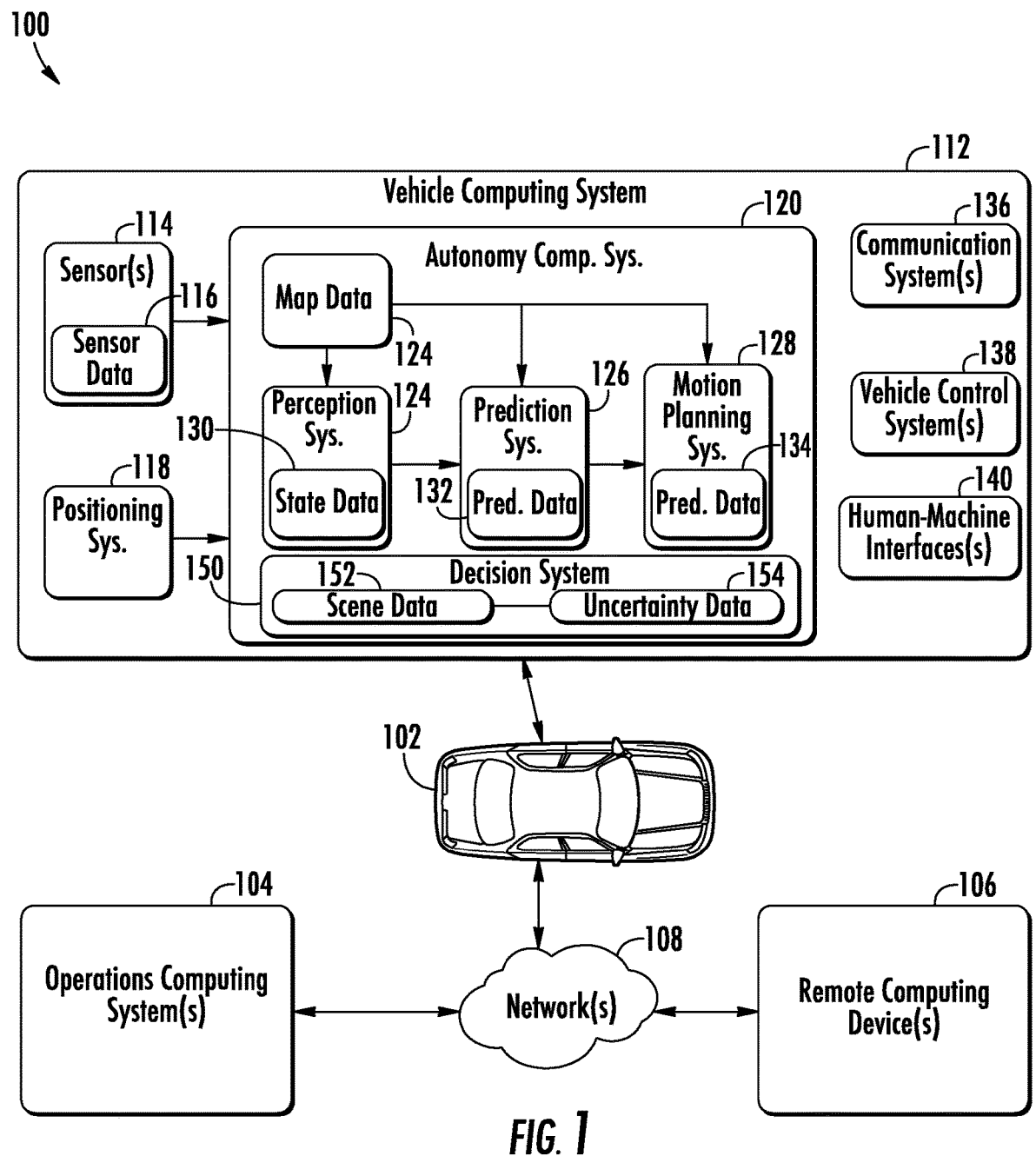
FIG. 1 depicts a block diagram of an example system for controlling the navigation of an autonomous vehicle according to example implementations of the present disclosure.

Reference now will be made in detail to embodiments, one or more example(s) of which are illustrated in the drawings. Each example is provided by way of explanation of the embodiments, not limitation of the present disclosure. In fact, it will be apparent to those skilled in the art that various modifications and variations can be made to the embodiments without departing from the scope or spirit of the present disclosure. For instance, features illustrated or described as part of one embodiment can be used with another embodiment to yield a still further embodiment. Thus, it is intended that aspects of the present disclosure cover such modifications and variations.

The present disclosure is directed to improved systems and methods for determining a vehicle motion plan based on one or more objects within the vehicle's surrounding environment. During travel, a vehicle may interact with one or more objects. For example, a vehicle may be required to stop for a pedestrian, pass another vehicle, slow down for a stop light, etc. To increase safety, it can be important determine a motion plan that independently accounts for each object. Effectively dealing with multiple objects and a number of travel decisions, however, can become computationally challenging. The present disclosure proposes systems and methods that increase the efficiency motion planning while improving the vehicle safety.

Example aspects of the present disclosure are directed to systems and methods for controlling autonomous vehicles. In particular, a motion planning system can determine a motion plan based on scene data including present and/or future state data for one or more objects within the surrounding environment of an autonomous vehicle. To do so, the motion planning system can decompose a scene into one or more subproblems, each subproblem including at least one object within the surrounding environment of the autonomous vehicle (e.g., how the autonomous vehicle should evaluate/react/maneuver in response to an object, etc.). The motion planning system can generate branching policies based on each of the one or more subproblems. Each of the branching policies can include one or more branches corresponding to a potential future state of the scene. Moreover, the branching policies can fork at one or more decision points. Each decision point can correspond to a point in time and/or distance where uncertainty associated with the scene is resolved. The motion planning system can aggregate the branching policies to select a policy to resolve the scene. In this way, the motion planning system can resolve scenes involving one or more objects, especially a plurality of objects, in a manner that is computationally efficient while still accounting for uncertainty within the scene. As such, an autonomous vehicle can be configured to safely and comfortably navigate a multiple-object scene.

More particularly, an autonomous vehicle can be a ground-based autonomous vehicle (e.g., car, truck, bus, bike, scooter, etc.) or another type of vehicle (e.g., aerial vehicle, etc.) that can operate with minimal and/or no interaction from a human operator. An autonomous vehicle can include a vehicle computing system located onboard the autonomous vehicle to help control the autonomous vehicle. The vehicle computing system can be located onboard the autonomous vehicle, in that the vehicle computing system can be located on or within the autonomous vehicle. The vehicle computing system can include one or more sensors, an autonomy computing system (e.g., for determining autonomous navigation), one or more vehicle control systems (e.g., for controlling braking, steering, powertrain, etc.), and/or other systems. The vehicle computing system can obtain sensor data from sensor(s) onboard the vehicle, attempt to comprehend the vehicle's surrounding environment by performing various processing techniques on the sensor data, and generate an appropriate motion plan through the vehicle's surrounding environment.

The vehicle computing system can receive sensor data from one or more sensors that are coupled to or otherwise included within the autonomous vehicle. For example, in some implementations, a perception system can be included within the vehicle computing system and configured to receive the sensor data. As examples, the one or more sensors can include a Light Detection and Ranging (LIDAR) system, a Radio Detection and Ranging (RADAR) system, one or more cameras (e.g., visible spectrum cameras, infrared cameras, etc.), a positioning system (e.g., GPS), and/or other sensors. The sensor data can include information that describes the location of static and/or dynamic objects within the surrounding environment of the autonomous vehicle. For example, the objects can include traffic signals, additional vehicles, pedestrians, bicyclists, signs (e.g., stop signs, yield signs), and/or other objects. The sensor data can include raw sensor data and/or data that has been processed or manipulated in some manner before being provided to other systems within the autonomy computing system.

In addition to the sensor data, the vehicle computing system (e.g., the perception system) can retrieve or otherwise obtain map data that provides detailed information about the surrounding environment of the autonomous vehicle. The map data can provide information regarding: the identity and location of different roadways, road segments, buildings, or other items; the location and directions of traffic lanes (e.g., the location and direction of a parking lane, a turning lane, a bicycle lane, or other lanes within a particular roadway); traffic control data (e.g., the location, timing, and/or instructions of signage (e.g., stop signs, yield signs), traffic lights (e.g., stop lights), or other traffic signals or control devices/markings (e.g., cross walks)); and/or any other map data that provides information that assists the vehicle computing system in comprehending and perceiving its surrounding environment and its relationship thereto.

The vehicle computing system (e.g., the perception system) can identify one or more objects that are proximate to the autonomous vehicle based on sensor data received from the one or more sensors and/or the map data. In particular, in some implementations, the vehicle computing system can provide, for one or more of the objects, present state data that describes a current state of such object. As examples, the present state data for each object can describe an estimate of the object's: current location (also referred to as position); current speed (also referred to as velocity); current acceleration, current heading; current orientation; size/footprint (e.g., as represented by a bounding polygon); class (e.g., vehicle vs. pedestrian vs. bicycle), current status (e.g., current color of a traffic light), and/or other state information.

The vehicle computing system can receive the present state data and can predict future state data for the identified object(s). For instance, in some implementations, a prediction system can be included within the vehicle computing system and configured to predict the future state data. In some implementations, the functionality of the perception system and the prediction system can be included within the same system. In some implementations, the perception and prediction systems can be separate from one another.

Various prediction techniques can be used to predict the future state data for the identified object(s). For example, the future state data for each object can describe an estimate of the object's: future location (also referred to as position); future speed (also referred to as velocity); future acceleration, future heading; future orientation; size/footprint (e.g., as represented by a bounding polygon); class (e.g., vehicle vs. pedestrian vs. bicycle), future status (e.g., future color of a traffic light), and/or other state information at one or more future points in time. The vehicle system can provide the predicted future state data of the objects to a motion planning system. In some implementations, predictions can be provided only for objects of certain class(es) (e.g., vehicles, bicyclists, pedestrians, etc.).

In some cases, the present and/or the future state data can be associated with uncertainty. For example, the accuracy of a present and/or future state of an object can depend on one or more variables that may be resolved over time and space. Thus, a sample space of possible solutions (e.g., in a scene) can narrow over time and/or space such that a majority of samples are eliminated. The possibility that a solution will be eliminated can be represented as one or more uncertainties associated with a particular state. In this manner, a motion planning system can create and modify a motion plan that accounts for the uncertainties when one or more solutions are unknown.

More particularly, a state may be associated with at least one of an aleatoric uncertainty, epistemic uncertainty, discrete uncertainty, perception uncertainty, interaction uncertainty, and/or prediction uncertainty. For example, in some cases, a state can be associated with an aleatoric uncertainty. An aleatoric uncertainty represents an inherent noise in observations, such as present and/or the future state data. By way of example, aleatoric uncertainty can result from noise in components of the vehicle computing system, such as sensor noise, motion noise (e.g., resulting from movement, vibrations, etc. of the autonomous vehicle and/or of one or more components of the autonomous vehicle), transmission noise (e.g., between two components of the autonomous vehicle), and/or electrical noise. Because such uncertainties are included in the operation of electrical components, additional data collection generally does not reduce aleatoric uncertainty.

In addition, a state can be associated with an epistemic uncertainty (e.g., model uncertainty) that is representative of uncertainties regarding software model parameters. Epistemic uncertainty can represent uncertainties in model parameters defining, for example, subproblem models, physics models (e.g., physics models defining physics of the machine-learned model), or any other software model. Moreover, epistemic uncertainty can relate to uncertainty associated with which model generated some collected data. Generally, epistemic uncertainty can be explained after collection of more data. Similarly, a state can be associated with a discrete uncertainty (e.g., calibration uncertainty). A discrete uncertainty can represent a calibration between a function or distribution estimated by a software model and the function or distribution itself. For example, the discrete uncertainty can represent the accuracy of a model. In some implementations, the discrete uncertainty can be continuous. For example, the uncertainty can be associated with a loss function (e.g., of a machine-learned model).

In some implementations, a state can be associated with a perception uncertainty representative of uncertainties associated with information perceived by the vehicle computing system such as sensor data. Perception uncertainty can be discrete (e.g., related to a type/class of object, existence of an object, presence of turn signals or brake lights, stopped or moving, etc.) and/or continuous (e.g., related to a state of an object such as shape, position, velocity, acceleration, heading, etc.). For example, perception uncertainty can be associated with occlusion. By way of example, in some cases, a portion of space surrounding an autonomous vehicle can be occluded such that the autonomous vehicle cannot obtain data relating to the occluded area. For example, the occluded area can hide objects of relevance from the autonomous vehicle. Thus, perception uncertainty can represent objects that were previously recognized by the autonomous vehicle but are now obscured in an occluded area.

In addition, or alternatively, perception uncertainty can be representative of data measurement uncertainties. For example, in some cases, perceived data (e.g., sensor data) can be inaccurate due to road conditions such as poor visibility resulting from darkness, fog, or other conditions can impact an accuracy of sensor data. Moreover, the characteristics of an object can impact the accuracy of sensor data. For example, darkly colored portions of vehicles can be difficult to detect with LIDAR sensors. In addition, in some implementations, perception uncertainty can represent uncertainties regarding autonomous vehicle localization. By way of example, perception uncertainty can be associated with the location of the autonomous vehicle with respect to map data. Moreover, perception uncertainty can be associated with progress along a route.

Additionally, or alternatively, perception uncertainty can represent an uncertainty regarding a future state of an object. For example, if the object is a pedestrian approaching a crosswalk, the vehicle computing system may not immediately be able to identify if the pedestrian intends to cross the crosswalk or wait at the crosswalk. As another example, if the object is another vehicle approaching a fork in a road, the vehicle computing system may not immediately be able to identify which path the other vehicle intends to follow. Thus, in some cases, the perception uncertainty can be resolved after further observation of the object. For example, if a vehicle appears to slow down before a predicted turn, the perception uncertainty regarding the predicted turn may be reduced. In this manner, perception uncertainties can be tied to a duration or distance. Thus, in some implementations, a perception uncertainty can be associated with a duration until the perception uncertainty is resolved.

In some implementations, a state can be associated with an interaction uncertainty representative of uncertainties regarding predicted interactions between an object and an action of the autonomous vehicle. For example, if an autonomous vehicle and another object approach stop signs at an intersection, it can be desirable to allow the first to arrive at the intersection to proceed through the intersection first. The predicted action of the object, however, can be uncertain where the first to arrive at the intersection is unclear. Indeed, the decision of whether to wait for the autonomous vehicle or to proceed through the intersection can be affected by an action chosen by the autonomous vehicle. For example, the object can be more likely to proceed through the intersection if the autonomous vehicle stops. Alternatively, the object can be more likely to stop if the autonomous vehicle begins to accelerate through the intersection. Thus, each future state of the object (e.g., whether the object will stop or continue through the intersection) can be associated with an interaction uncertainty associated with a possible action taken by the autonomous vehicle. As another example, predicted actions of other vehicles on the road can be affected by an autonomous vehicle's decision to change lanes. For instance, a vehicle travelling faster than the autonomous vehicle that finds itself behind the autonomous vehicle after a lane change may choose between decreasing speed to match a speed of the autonomous vehicle, maintaining its speed with the expectation that autonomous vehicle will accelerate, or changing lanes to pass the autonomous vehicle. Interaction uncertainties can be predicted for each future state change before the autonomous vehicle decides to change lanes.

Additionally, or alternatively, a state may be associated with a prediction uncertainty representative of the accuracy of predictions made by the vehicle computing system. For example, prediction uncertainty can be discrete and include uncertainties associated with the goal of an object (e.g., based on a history of observations, etc.) and/or decisions of the autonomous vehicle (e.g., passing or yielding, etc.). Moreover, in some implementations, prediction uncertainty can be continuous and include, for example, a distribution over a state space or a trajectory space, and/or uncertainty associated with time evolution of observed states (e.g., acceleration, velocity, position, heading, etc.).

The vehicle computing system can identify one or more uncertainties and/or a duration (e.g., a time duration and/or spatial duration, etc.) until each uncertainty can be resolved. For example, an uncertainty can be resolved by attaining more accurate sensor data, determining accurate future state data (e.g., future locations, future status, etc.) of an object, or other suitable increase in certainty of a present and/or future state of an area of relevance to the autonomous vehicle. By way of example, a time duration can include an estimate of how much time may elapse before the vehicle computing system expects to resolve the uncertainty associated with a predicted future state of an object. As another example, a spatial duration can include an estimate of a distance travelled before the vehicle computing system expects to resolve an uncertainty associated with a state of an object. Moreover, a duration can include a number of measurements or observations before the vehicle computing system expects to resolve the uncertainty.

Example aspects of the present disclosure enable a motion planning system for an autonomous vehicle to identify uncertainties associated with one or more states of one or more objects within the surrounding environment of the vehicle and develop a motion plan based at least in part on the uncertainties associated with each state. The motion planning system can be incorporated in a vehicle computing system in and/or external to the autonomous vehicle. In some implementations, the motion plan can include instructions that recite actions to be performed by the autonomous vehicle. For example, the motion plan can include actions such as "pass" or "yield." As another example, the motion plan can include actions such as "lane change" or "nudge right" or "nudge left." Moreover, the motion plan can include low-level actions such as control actions.

The vehicle computing system (e.g., the motion planning system) can obtain scene data descriptive of one or more objects within the surrounding environment of the autonomous vehicle. The scene data can include present and/or future state data for one or more objects. Present and/or future state data can include, for example, data describing an object's and/or an estimate of the object's: location (also referred to as position); speed (also referred to as velocity); acceleration, heading; orientation; size/footprint (e.g., as represented by a bounding polygon); class (e.g., vehicle vs. pedestrian vs. bicycle), status (e.g., color of a traffic light), and/or other state information at one or more present and/or future points in time. In some implementations, the scene can be represented as Partially Observable Markov Decision Processes (POMDP). For instance, the scene can be defined in terms of parameters including a state space S, action space A, transition model T, reward function R, observation space O, and observation model Z.

The vehicle computing system (e.g., the motion planning system) can determine one or more subproblems based on the scene data. For example, the motion planning system can determine one or more subproblems corresponding to at least one object within the surrounding environment of the autonomous vehicle. In some implementations, the motion planning system can determine one or more subproblems for each object identified from the scene data. For example, each subproblem can describe interactions (e.g., present and future) between a single object and the autonomous vehicle. In this manner, the motion planning system can simplify robust scene data by breaking down the data into computationally simple single actor subproblems. For example, in some implementations, each subproblem may be associated with a pre-computed solution that can then be looked up to solve the subproblem without requiring substantial computing resources and/or computing time. For instance, subproblems can include speed control problems that in some cases can be limited by a single constraint.

Each subproblem can be associated with one or more travel decisions for the autonomous vehicle. For example, the one or more travel decisions can be associated with the objects of each of the one or more subproblems. For example, the one or more travel decisions can include an indication of whether or not to perform an action with respect to an object, such as a high-level action (e.g., "pass," "yield," etc.). In some implementations, the one or more subproblems can be defined over a time duration. For example, the time duration can be fixed for each subproblem (e.g., one second, etc.).

In some implementations, the vehicle computing system (e.g., the motion planning system) can identify one or more viable travel decisions from the one or more travel decisions associated with each subproblem. In this manner, the motion planning system can eliminate nonviable travel decisions from the one or more travel decisions associated with each subproblem. For example, in some cases, the number of travel decisions required for a scene with N objects and D travel decisions per object can scale as $O(D^N)$, which can require substantial computing resources to fully consider. Thus, eliminating nonviable travel decisions can be desirable to avoid expending computing resources. Viable and/or nonviable travel decisions can be identified by physics rules or heuristics. For example, nonviable decisions may be associated with objects that are at a position and/or traveling at a speed and/or a direction such that the objects are unlikely or incapable of interacting with the autonomous vehicle in a relevant future (e.g., within the time window of the future state data, etc.).

In some implementations, a plurality of travel decisions can be grouped into one or more travel decisions groups. For example, in multi-actor scenes, a travel decision associated with one object may necessitate another decision with respect to another object. In such a case, each decision may be grouped into a travel decision group. Thus, a travel decision group can include a plurality of travel decisions that collectively account for each object within the surrounding environment of the autonomous vehicle. By way of example, a decision grouping can include a decision to (e.g., "pass," "yield," etc.) for some or all of the objects within the surrounding environment of the autonomous vehicle.

Each of the one or more subproblems can define one or more parameters and/or constraints based on the one or more travel decisions associated with the subproblem. For example, parameters can include problem variables, state variables, control variables, constraints, thresholds, and/or other parameters. In some implementations, each of the one or more subproblems can be associated with determining some of the one or more parameters. For example, the one or more parameters can include an initial state of the autonomous vehicle and a subproblem can be associated with determining the initial state of the vehicle. By way of example, the initial state of the autonomous vehicle can include an initial speed (e.g., in meters per second) of the autonomous vehicle and/or an initial acceleration (e.g., in meters per second) of the autonomous vehicle. Thus, a subproblem can be directed to determining an initial speed or acceleration of the autonomous vehicle based on scene data.

In addition, in some implementations, each of the one or more subproblems can define one or more cost and reward functions associated with satisfying and/or violating some or all of the one or more parameters and/or constraints. For example, each subproblem can include at least one cost function associated with satisfying and/or violating one or more constraints. In addition, or alternatively, in some implementations, each subproblem can include at least one reward function associated with satisfying one or more parameters of the subproblem.

Solutions to the one or more subproblems can be known, previously computed, and/or dynamically determined. For example, in some implementations, the subproblems can include an adaptive cruise control problem, push problems, stop guard problems, and/or speed limit problems. A solution to each type of subproblem can include one or more of the parameters defined by the one or more subproblems. Such precomputed solutions can be stored in memory onboard the autonomous vehicle. By way of example, the solutions can be stored in a data structure such as a table (e.g., a lookup table, etc.).

For example, a subproblem can include an adaptive cruise control (ACC) subproblem that relates to the autonomous vehicle following an object traveling in front of the autonomous vehicle. For example, an ACC subproblem can be utilized when an autonomous vehicle shares a lane with another object. Parameters defining an ACC subproblem can include a target speed (e.g., in meters per second, etc.), a start distance along a path (e.g., in meters, feet, etc.), and/or a start time (e.g., in seconds, etc.). In some implementations, an ACC subproblem can define constraints such as a constant velocity, constant acceleration over a time duration (e.g., one second, etc.), and/or a constant distance between the autonomous vehicle and an object traveling in front of the autonomous vehicle. In addition, the ACC subproblem can define one or more cost functions associated with satisfying and/or violating the one or more constraints. For example, the ACC subproblem can provide a cost function associated with changing the speed and/or acceleration of the autonomous vehicle. As another example, the ACC subproblem can define one or more reward functions (e.g., a negative cost function, etc.) associated with satisfying one or more parameters of the ACC subproblem. For example, the ACC subproblem can provide a reward function associated with maintaining a speed and/or acceleration of the autonomous vehicle.

In addition, or alternatively, a subproblem can include a push subproblem that relates to an autonomous vehicle moving to a target position by a certain point in time. For instance, a push subproblem can be used when an autonomous vehicle must be ahead of a point by some time, such as before another object crosses a path of the autonomous vehicle. Parameters defining a push subproblem can include a target speed (e.g., in meters per second, etc.), a start distance along a path (e.g., in meters, etc.), a start time (e.g., in seconds, etc.), a target position (e.g., coordinates, 2D bound area, 3D bound volume, etc.), and/or a target time. In some implementations, the target position can be assumed based on a target speed. Similarly, in some implementations, a target time can be assumed based on a fixed time period associated with the subproblem (e.g., one second, etc.). The push subproblem can define constraints such as, for example, constant velocity and/or constant acceleration over a time duration (e.g., one second, etc.), and/or one or more speed/acceleration thresholds.

In some implementations, the push subproblem can define one or more cost functions associated with satisfying and/or violating the one or more constraints. For example, the push subproblem can provide a cost function associated with changing a speed and/or acceleration of the autonomous vehicle. As another example, the push subproblem can provide a reward function (e.g., a negative cost function, etc.) associated with maintaining a speed and/or acceleration of the autonomous vehicle. Moreover, the push subproblem can provide a cost function associated with decreasing a speed and/or acceleration of the vehicle below a threshold (e.g., such that the vehicle misses the target position, etc.) and/or increasing speed above a threshold (e.g., a speed limit, etc.).

In addition, or alternatively, a subproblem can include a stop guard subproblem. A stop guard subproblem can relate to stopping an autonomous vehicle at a target location. For example, a stop guard subproblem can be used to stop an autonomous vehicle for a stop sign, traffic light, and/or other suitable obstruction. Parameters defining a stop guard subproblem can include a start distance along a path (e.g., in meters, etc.), target/end time (e.g., in seconds, etc.), and/or a target position (e.g., in meters, etc.). Moreover, in some implementations, the stop guard subproblem can define constraints such as, for example, a deceleration threshold.

In some implementations, a stop guard subproblem can define one or more cost functions associated with satisfying and/or violating the one or more constraints. For example, the stop guard subproblem can provide a cost function associated with violating the deceleration threshold (e.g., decelerating too slowly and/or too quickly). As another example, the stop guard subproblem can provide a cost function associated with failing to stop by the end time and/or at the end position.

In addition, or alternatively, a subproblem can include a speed limit subproblem that relates to regulating a speed (e.g., a maximum and/or minimum speed) of the autonomous vehicle. For example, the speed limit subproblem can be used to limit the speed of an autonomous vehicle to adhere to legal and/or safety requirements of a road segment or other suitable travel path. Parameters defining a speed limit subproblem can include a target speed (e.g., in meters per second, etc.), a start distance along a path (e.g., in meters, etc.), an end distance along a path (e.g., in meters, etc.), a start time (e.g., in seconds, etc.), and/or an end time (e.g., in seconds, etc.). Constraints can include a minimum and/or maximum speed.

In some implementations, the speed limit subproblem can define one or more cost functions associated with satisfying and/or violating the one or more constraints. For example, the speed limit subproblem can provide a cost function associated with violating the minimum and/or maximum speed. As another example, the speed limit subproblem can provide a reward function (e.g., a negative cost function, etc.) associated with maintaining the speed of the autonomous vehicle at the target speed.

In some cases, paths traveled by the autonomous vehicle can curve or otherwise be two-dimensional. However, it can be desirable to define subproblems along one-dimensional (e.g., linear) paths. Doing so can reduce the memory requirements of pre-computed solutions to the subproblems. Representing complex problems as a composition of subproblems can allow for solutions to the complex problems to be determined using the pre-computed solutions so that solutions can be retrieved quickly and/or locally (e.g., onboard the autonomous vehicle). In some implementations, however, subproblems can be defined along two-dimensional paths. For example, a path curvature of a path traveled by an autonomous vehicle can be compared to reference paths which have pre-computed solutions to find the pre-computed solutions for the most similar reference path. Additionally, and/or alternatively, path curvature can be represented as speed constraints (e.g., speed constraints applied to pre-computed one-dimensional solutions, etc.).

In some implementations, the pre-computed solutions to the subproblems can be adjusted based on uncertainty. For example, the pre-computed solutions to the one or more subproblems can be stored in a table (e.g., look-up table, etc.), with dimensions defined by some or all of the parameters of the subproblem. The pre-computed solutions can be adjusted based on uncertainty by a weighted look-up kernel. For example, one example kernel for a 3-D value function for stopping at a certain distance from an object can include a second-order spline interpolation over speed and acceleration.

Additionally, and/or alternatively, pre-computed solutions for a plurality of parameterizations of the subproblem can be weighted by a probability associated with the uncertainty. For example, the uncertainty can define a probability density function for the plurality of parameterizations. In such a case, the solutions can be weighted by the probability density function. In addition, or alternatively, uncertainty can be represented by an additional parameter for the pre-computed solutions. For example, uncertainty can define an extra dimension in a lookup table. In this manner, pre-computed solutions for 100% certainty can be adjusted by gaussian weights across varying uncertainty.

The vehicle computing system (e.g., the motion planning system) can generate one or more branching policies based at least in part on the one or more subproblems. Each of the one or more branching policies can include state data associated with the autonomous vehicle and/or one or more objects in the surrounding environment of the autonomous vehicle. For example, each branching policy can include a tree structure with a plurality of nodes and a plurality of branches. In some implementations, each of the plurality of nodes can correspond to one or more states or actions associated with the autonomous vehicle or the one or more objects within the surrounding environment of the autonomous vehicle. For example, each of the plurality of nodes can correspond to one or more predicted states and/or actions associated with the autonomous vehicle and/or the one or more objects within the surrounding environment of the autonomous vehicle.

By way of example, in some implementations, each node in the plurality of nodes can include data indicative of the state of the autonomous vehicle relative to one or more objects such as, for example, the position of the AV relative to one or more objects, the speed of the AV relative to one or more objects, etc. Moreover, in some implementations, each node can include data indicative of one or more actions necessary to transition the autonomous vehicle to another state relative to one or more objects within the surrounding environment of the autonomous vehicle. In this regard, in some implementations, each node in the plurality of nodes can include data indicative of one or more pointers to children nodes. Children nodes with respect to a respective node in the plurality of nodes, for example, can include data indicative of different state data reachable by one or more actions at the respective node. In this way each branching policy can include one or more branches corresponding to a series of states associated with the one or more objects and/or the autonomous vehicle connected by one or more pointers.

In some implementations, each branch policy can correspond to one or more travel decisions. For example, the motion planning system can identify one or more viable travel decisions for navigating the surrounding environment of the vehicle based on the scene data. In some implementations, the motion planning system can generate at least one branching policy for each viable travel decision. For example, each branching policy can correspond to a travel decision group. The branching policy can include a series of state changes with respect to the one or more objects associated with each subproblem based at least in part on one travel decision or travel decision group. For example, the motion planning system can generate a branching policy by determining one or more predicted states or actions based at least in part on the one or more travel decisions associated with the branching policy.

In some implementations, each branch of a branching policy can include an associated probability representing a likelihood associated with a series of states or actions based on a travel decision. In some implementations, the probabilities can be determined based on a policy function. In this manner, the vehicle computing system (e.g., the motion planning system) can consider each series of states based on a likelihood that the series will occur when a travel decision is made. This, in turn, can allow the motion planning system to evaluate a travel decision with respect to every object within the surrounding environment of the autonomous vehicle based on the likely effect that travel decision will have on each object. The resulting motion plan can thus satisfy a worst-case scenario while preparing for the most likely scenarios.

In some implementations, the branching policy can include one or more decision points representing a point at which uncertainty associated with state data associated with the autonomous vehicle or one or more objects in the surrounding environment of the autonomous vehicle is reduced. For example, in some implementations, the branching policy can branch and/or fork at the one or more decision points. Additionally, and/or alternatively, some or all of the one or more decision points can correspond to a point at which a travel decision can be made. For instance, the travel decision can be associated with an object associated with the state data for which uncertainty is reduced. For example, the travel decision can be a decision to pass the object increasing the likelihood that the position of the object relative to the vehicle will change.

Each decision point can include a future point in time. For example, each decision point can represent a future point (e.g., point in time, number of future observations, future proximity, etc.) at which the autonomous vehicle expects to gain insight into some uncertain characteristic. For example, if an autonomous vehicle is passing under a road sign that obscures a traffic light, there can be uncertainty associated with a state of the traffic light. The autonomous vehicle can expect to clear the road sign at some future point (e.g., after some time period and/or after traveling some distance and/or after a number of observations, etc.) and, after clearing the road sign, can expect to perceive the state of the traffic light. Thus, the future point at which the autonomous vehicle clears the road sign can be a decision point. As another example, a decision point can include a point in time where a "worst-case" scenario is expected to be cleared before the uncertainty is resolved, similar to a resolution of uncertainty.

In some implementations, a branching policy can include one or more nodes corresponding to a predicted state and/or action associated with the autonomous vehicle and/or one or more objects in the surrounding environment of the autonomous vehicle. In some implementations, the one or more nodes of the branching policy can be spaced along time steps over some period of time such as forecast horizon. For example, state data of each of the one or more branching policies can include a series of states spaced along time steps over a period of time such as a forecast horizon. The root node of each branching policy can represent an initial state of an object and/or the autonomous vehicle. The root node can branch for one or more potential travel decisions in a scene. Uncertainty in a scene (e.g., discrete uncertainty, etc.) can be represented by a fork in the branching policy, and nodes following the fork can correspond to resolved states of the uncertainty. For example, the nodes can correspond to the presence of an object and/or the absence of the object. As another example, the nodes can correspond to actions of an object (e.g., left turn versus right turn, etc.). Additionally, or alternatively, a node following a fork can correspond to continued uncertainty until a future point in time (e.g., the next time step, etc.).

The vehicle computing system (e.g., motion planning system) can determine one or more costs for each of the one or more branching policies. For example, the motion planning system can determine a cost associated with each branch in a branching policy. The cost can indicate a general measure of desirability associated with scenarios (e.g., travel decisions) defined by the branch. For instance, the cost can represent a cost associated with satisfying and/or violating one or more constraints defined by one or more subproblems associated with the branching policy. In some implementations, for example, the cost can be a total cost to a goal and/or a Q-value.

In some implementations, the vehicle computing system (e.g., motion planning system) can determine a cost associated with a first portion of the one or more branches by a first process and a cost associated with a second portion of the one or more branches by a second process. For example, in some implementations, the first process can be a computationally intensive process, such as an iterative linear quadratic regulator. Additionally, and/or alternatively, the second process can approximate the first process. For instance, the second process can be less computationally intensive than the first process while providing a similar output to the first process. For example, the second process can be a machine-learned model, such as a machine-learned function modeling the first process.

In some implementations, the first portion of the one or more branches can include branches with a high likelihood or probability. In other words, the first portion of the one or more branches can correspond to events that are likely to occur. For instance, in some implementations, the first portion can include branches with a probability greater than a threshold, such as for example 50%. In some implementations, the second portion of the one or more branches can include branches with a low likelihood or probability. In other words, the second portion of the one or more branches can correspond to events that are unlikely to occur. For instance, in some implementations, the second portion can include branches with a probability less than a threshold, such as for example 50%. The first portion and/or the second portion can be selected by any suitable method.

In some implementations, the vehicle computing system (e.g., motion planning system) can determine a cost associated with each branch in a branching policy by determining a cost associated with an optimal travel path for the branch. For instance, in some implementations, the cost can be determined with respect to more relevant objects than the subproblem for which the branching policy was generated for. For instance, the vehicle computing system (e.g., motion planning system) can generate a series of travel decisions (e.g., a branch, etc.) for navigating an uncertain scenario for one subproblem involving one object and then determine how well the series of travel decisions can be used practically in the scene of the autonomous vehicle.

For instance, in some implementations, the vehicle computing system (e.g., motion planning system) can generate a plurality of candidate travel paths for each branch in a branching policy. The motion planning system can determine a total cost associated with each of the plurality of candidate travel paths. The motion planning system can search (e.g., iteratively search, etc.) over a motion planning space (e.g., a scene, etc.) to identify an optimal travel path of the plurality of candidate travel paths based at least in part on the total cost associated with each of the plurality of candidate travel paths. For instance, the motion planning space can be a Frenet space and/or a cartesian space. The optimal travel path can optimize (e.g., locally optimize, etc.) a total cost associated with the branch, as provided by one or more cost functions. For example, each candidate travel path can include a series of states and/or a series of controls to achieve the series of states. Each state can include the autonomous vehicle's or other object's current location (also referred to as position); current speed (also referred to as velocity); current acceleration, current heading; current orientation; and/or other state information. As an example, in some implementations, the optimization planner can be or include an iterative linear quadratic regulator or similar iterative solver.

In this manner, the motion planning system can determine a cost for each branch of a branching policy based at least in part on an optimal travel path. For instance, in some implementations, the vehicle computing system can employ or otherwise include one or more cost functions that, when evaluated, provide a total cost for a particular travel path. The optimization planner can search over a motion planning space (e.g., a vehicle state space, etc.) to identify a travel path that optimizes (e.g., locally optimizes, etc.) the total cost provided by the one or more cost functions. Example cost functions can include a portion that provides a cost (e.g., through increased cost penalization, etc.) that discourages an autonomous vehicle from performing actions that violate or approach one or more constraints, such as travel paths that come undesirably close to objects or that implement undesired speeds and/or maneuvers. Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, and/or other forms of progression toward completion of a route. In one example implementation, the total cost equals the sum of all costs minus the sum of all rewards and the optimization planner attempts to minimize the total cost. The cost functions can be evaluated by a penalty/reward generator.

According to example aspects of the present disclosure, approximating a portion of the one or more branches that corresponds to unlikely events can allow for several advantages. For instance, approximating a portion of the one or more branches can reduce the usage of computing resources. For example, computing resources onboard an autonomous vehicle can be limited, and in some cases, it can be desirable to reduce the use of limited computing resources (e.g., to allow the computing resources to be used for other tasks, etc.). Additionally, in cases where the portion of the one or more branches are unlikely, the approximation can serve in place of the cost of the one or more branches for the purposes of selecting a motion plan while not adversely affecting operation of the autonomous vehicle.

In some implementations, determining a cost associated with the branching policy can include back-propagating cost values through the branching policy. For example, the branching policy can include one or more parent nodes each having one or more child nodes. A cost can be determined for each of the one or more child nodes. A cost for a parent node can be determined as a weighted sum of the costs of the child nodes of the parent node. For example, the costs of the child nodes can be weighted by a probability associated with each of the child nodes. Thus, after the back-propagation is completed, the root node of the branching policy can represent the cost of the branching policy.

In some cases, interaction between an object and an autonomous vehicle can affect the decisions of the object and travel decision for the autonomous vehicle. For example, yielding between the object and the autonomous vehicle can be affected by the actions of the objects and the autonomous vehicle. In such cases, for instance, the motion planning system can generate a branching policy for the interacting object. The motion planning system can create a new policy against the branching policy and update branching policies for other objects based on the new policy. This can be repeated until convergence.

As another example, the vehicle computing system (e.g., motion planning system, etc.) can determine a travel decision for an object, then plan for a future time period (e.g., half a second, etc.) based on that decision, simulate the future state at the end of the future time period for the object and the autonomous vehicle, then generate new policies at the new state. This can be repeated until the end of a forecast horizon.

The vehicle computing system (e.g., motion planning system, etc.) can select a motion plan for the autonomous vehicle based on the one or more costs associated with each of the branching policies. In some implementations, the motion plan can be selected by a remote computing system, such as a computing system that is not onboard the autonomous vehicle. For example, the motion plan can be selected by a central server connected to a plurality of autonomous vehicles.

The motion planning system can aggregate the costs associated with corresponding branches of each branching policy to determine a total cost associated with each branch. In some implementations, the motion planning system can select a motion plan based on the branches of one or more of the branching policies associated with the lowest total cost.

In some implementations, a motion plan can be generated based at least in part on the one or more branching policies for each of the one or more travel decisions. For example, in some implementations, a branching policy can be generated for each of one or more travel decision groups. Each travel decision group can include a plurality of travel decisions that collectively account for each object within the surrounding environment of the autonomous vehicle. In some implementations, the motion planning system can generate the motion plan based on the travel decision group associated with at least one branching policy.

In some implementations, the motion plan can be implemented to navigate the autonomous vehicle. For example, the motion planning system can be provided for use in controlling a motion of the vehicle. For instance, in some implementations, one or more control actions can be determined based on the motion plan. In some implementations, the one or more control actions can be implemented by the autonomous vehicle (e.g., by a vehicle controller, etc.) to navigate the autonomous vehicle. For instance, in some implementations, the motion planning system can select a highest probability branch of the branching policy with the lowest cost.

Example aspects of the present disclosure can provide for a number of technical effects and benefits, including improvements to computing systems. For instance, one example technical effect according to example aspects of the present disclosure can be an improved safety assurance. In some cases, especially cases involving multiple actors and/or decisions, exhaustively testing every possibility can be computationally infeasible. Systems and methods according to the present disclosure can allow for an autonomous vehicle to safely navigate scenes having multiple objects and/or requiring multiple decisions that could otherwise be challenging or impossible to navigate effectively while considering the safety of each object and/or decision.

Another example technical effect according to example aspects of the present disclosure can be a facilitated integration with existing subcomponents of an autonomous vehicle navigation system. For example, the motion planning system according to example aspects of the present disclosure can be configured to select a motion plan from a branching policy, such as a motion plan that could be interpreted by existing autonomous vehicle control system. Thus, despite achieving the advantages of considering uncertainty and determining solutions for multiple outcomes of the uncertainty, the motion planning system can still integrate with existing control systems.

Various means can be configured to perform the methods and processes described herein. For example, a computing system can include data obtaining unit(s), subproblem determining unit(s), policy generation unit(s), cost determination unit(s), motion plan selection unit(s), motion plan implementation unit(s), data providing unit(s), and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry, for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means can be configured to obtain data, for example, from a perception system and/or another system. For example, the means can be configured to obtain scene data, such as scene data descriptive of one or more objects. A data obtaining unit is one example of means for obtaining such data as described herein.

The means can be configured to determine subproblems. For example, the means can be configured to determine one or more subproblems for one or more objects based on the scene data. A subproblem determining unit is one example of a means for determining subproblems as described herein.

The means can be configured to generate policies. For example, the means can be configured to generate one or more branching policies with regard to one or more subproblems. The one or more branching policies can include one or more branches. A policy generation unit is one example of a means for generating policies as described herein.

The means can be configured to determine costs. For example, the means can be configured to determine one or more costs for one or more branching policies. A cost determining unit is one example of a means for determining costs as described herein.

The means can be configured to select a motion plan. For example, the means can be configured to select a motion plan from one or more branching policies with regard to one or more costs associated with the one or more branching policies. A motion plan selection unit is one example of a means for selecting a motion plan as described herein.

The means can be configured to implement a motion plan. For example, the means can be configured to implement the motion plan to control motion of an autonomous vehicle. A motion plan implementation unit is one example of a means for implementing a motion plan as described herein.

With reference now to the FIGS., example aspects of the present disclosure will be discussed in further detail. FIG. 1 illustrates an example vehicle computing system 100 according to example embodiments of the present disclosure. The vehicle computing system 100 can be associated with a vehicle 105. The vehicle computing system 100 can be located onboard (e.g., included on and/or within) the vehicle 105.

FIG. 1 depicts a block diagram of an example system 100 for controlling the navigation of an autonomous vehicle according to example embodiments of the present disclosure. As illustrated, FIG. 1 shows a system 100 that can include a vehicle 102; an operations computing system 104; one or more remote computing devices 106; a communication network 108; a vehicle computing system 112; one or more autonomy system sensors 114; autonomy system sensor data 116; a positioning system 118; an autonomy computing system 120; map data 122; a perception system 124; a prediction system 126; a motion planning system 128; state data 130; prediction data 132; motion plan data 134; a communication system 136; a vehicle control system 138; and a human-machine interface 140.

The operations computing system 104 can be associated with a service entity that can provide one or more vehicle services to a plurality of users, passengers, riders, etc. via a fleet of vehicles that includes, for example, the vehicle 102. The vehicle services can include transportation services (e.g., rideshare services), courier services, delivery services, and/or other types of services.

The operations computing system 104 can include multiple components for performing various operations and functions. For example, the operations computing system 104 can include and/or otherwise be associated with the one or more computing devices that are remote from the vehicle 102. The one or more computing devices of the operations computing system 104 can include one or more processors and one or more memory devices. The one or more memory devices of the operations computing system 104 can store instructions that when executed by the one or more processors cause the one or more processors to perform operations and functions associated with operation of one or more vehicles (e.g., a fleet of vehicles), with the provision of vehicle services, the transport, delivery, and/or retrieval of autonomous robots, and/or other operations as discussed herein.

For example, the operations computing system 104 can be configured to monitor and communicate with the vehicle 102 and/or its users to coordinate a vehicle service provided by the vehicle 102. To do so, the operations computing system 104 can manage a database that includes data including vehicle status data associated with the status of vehicles including the vehicle 102. The vehicle status data can include a state of a vehicle, a location of a vehicle (e.g., a latitude and longitude of a vehicle), the availability of a vehicle (e.g., whether a vehicle is available to pick-up or drop-off passengers and/or cargo, etc.), the status of one or more vehicle systems, the status of one or more autonomous robots, and/or the state of objects internal and/or external to a vehicle (e.g., the physical dimensions and/or appearance of objects internal/external to the vehicle).

The operations computing system 104 can communicate with the one or more remote computing devices 106 and/or the vehicle 102 via one or more communications networks including the communications network 108. The communications network 108 can exchange (send or receive) signals (e.g., electronic signals) or data (e.g., data from a computing device) and include any combination of various wired (e.g., twisted pair cable) and/or wireless communication mechanisms (e.g., cellular, wireless, satellite, microwave, and radio frequency) and/or any desired network topology (or topologies). For example, the communications network 108 can include a local area network (e.g. intranet), wide area network (e.g. Internet), wireless LAN network (e.g., via Wi-Fi), cellular network, a SATCOM network, VHF network, a HF network, a WiMAX based network, and/or any other suitable communications network (or combination thereof) for transmitting data to and/or from the vehicle 102.

Each of the one or more remote computing devices 106 can include one or more processors and one or more memory devices. The one or more memory devices can be used to store instructions that when executed by the one or more processors of the one or more remote computing devise 106 cause the one or more processors to perform operations and/or functions including operations and/or functions associated with the vehicle 102 including exchanging (e.g., sending and/or receiving) data or signals with the vehicle 102, monitoring the state of the vehicle 102, and/or controlling the vehicle 102; operations and/or functions associated with one or more autonomous robots; and/or the like. The one or more remote computing devices 106 can communicate (e.g., exchange data and/or signals) with one or more devices including the operations computing system 104 and the vehicle 102 via the communications network 108.

The one or more remote computing devices 106 can include one or more computing devices (e.g., a desktop computing device, a laptop computing device, a smart phone, and/or a tablet computing device) that can receive input or instructions from a user or exchange signals or data another computing device or computing system (e.g., the operations computing system 104). Further, the one or more remote computing devices 106 can be used to determine and/or modify one or more states of the vehicle 102 including a location (e.g., a latitude and longitude), a velocity, acceleration, a trajectory, and/or a path of the vehicle 102 based in part on signals or data exchanged with the vehicle 102. In some implementations, the operations computing system 104 can include the one or more remote computing devices 106.

The vehicle 102 can be a ground-based vehicle (e.g., an automobile, truck, etc.), an aircraft, and/or another type of vehicle. The vehicle 102 can be an autonomous vehicle that can perform various actions including driving, navigating, and/or operating, with minimal and/or no interaction from a human driver. The autonomous vehicle 102 can be configured to operate in one or more modes including, for example, a fully autonomous operational mode, a semi-autonomous operational mode, a park mode, a sleep mode, and/or the like. A fully autonomous (e.g., self-driving) operational mode can be one in which the vehicle 102 can provide driving and navigational operation with minimal and/or no interaction from a human driver present in the vehicle. A semi-autonomous operational mode can be one in which the vehicle 102 can operate with some interaction from a human driver present in the vehicle. Park and/or sleep modes can be used between operational modes while the vehicle 102 performs various actions including waiting to provide a subsequent vehicle service, and/or recharging between operational modes.

An indication, record, and/or other data indicative of the state of the vehicle, the state of one or more passengers of the vehicle, the state of one or more autonomous robots, and/or the state of an environment including one or more objects (e.g., the physical dimensions and/or appearance of the one or more objects) can be stored locally in one or more memory devices of the vehicle 102. Additionally, the vehicle 102 can provide data indicative of the state of the vehicle, the state of one or more passengers of the vehicle, the state of one or more autonomous robots, and/or the state of an environment to the operations computing system 104, which can store an indication, record, and/or other data indicative of the state of the vehicle, the state of one or more passengers of the vehicle, the state of one or more autonomous robots, and/or the state of an environment in one or more memory devices associated with the operations computing system 104 (e.g., remote from the vehicle). Furthermore, the vehicle 102 can provide data indicative of the state of the one or more objects (e.g., physical dimensions and/or appearance of the one or more objects) within a predefined distance of the vehicle 102 to the operations computing system 104, which can store an indication, record, and/or other data indicative of the state of the one or more objects within a predefined distance of the vehicle 102 in one or more memory devices associated with the operations computing system 104 (e.g., remote from the vehicle).

The vehicle 102 can include and/or be associated with the vehicle computing system 112. The vehicle computing system 112 can include one or more computing devices located onboard the vehicle 102. For example, the one or more computing devices of the vehicle computing system 112 can be located on and/or within the vehicle 102. The one or more computing devices of the vehicle computing system 112 can include various components for performing various operations and functions. For instance, the one or more computing devices of the vehicle computing system 112 can include one or more processors and one or more tangible, non-transitory, computer readable media (e.g., memory devices). The one or more tangible, non-transitory, computer readable media can store instructions that when executed by the one or more processors cause the vehicle 102 (e.g., its computing system, one or more processors, and other devices in the vehicle 102) to perform operations and functions, including those described herein.

As depicted in FIG. 1, the vehicle computing system 112 can include the one or more autonomy system sensors 114; the positioning system 118; the autonomy computing system 120; the communication system 136; the vehicle control system 138; and the human-machine interface 140. One or more of these systems can be configured to communicate with one another via a communication channel. The communication channel can include one or more data buses (e.g., controller area network (CAN)), on-board diagnostics connector (e.g., OBD-II), and/or a combination of wired and/or wireless communication links. The onboard systems can exchange (e.g., send and/or receive) data, messages, and/or signals amongst one another via the communication channel.

The one or more autonomy system sensors 114 can be configured to generate and/or store data including the autonomy sensor data 116 associated with one or more objects that are proximate to the vehicle 102 (e.g., within range or a field of view of one or more of the one or more sensors 114). The one or more autonomy system sensors 114 can include a Light Detection and Ranging (LIDAR) system, a Radio Detection and Ranging (RADAR) system, one or more cameras (e.g., visible spectrum cameras and/or infrared cameras), motion sensors, and/or other types of imaging capture devices and/or sensors. The autonomy sensor data 116 can include image data, radar data, LIDAR data, and/or other data acquired by the one or more autonomy system sensors 114. The one or more objects can include, for example, pedestrians, vehicles, bicycles, lights, and/or other objects. The one or more sensors can be located on various parts of the vehicle 102 including a front side, rear side, left side, right side, top, or bottom of the vehicle 102. The autonomy sensor data 116 can be indicative of locations associated with the one or more objects within the surrounding environment of the vehicle 102 at one or more times. For example, autonomy sensor data 116 can be indicative of one or more LIDAR point clouds associated with the one or more objects within the surrounding environment. The one or more autonomy system sensors 114 can provide the autonomy sensor data 116 to the autonomy computing system 120.

In addition to the autonomy sensor data 116, the autonomy computing system 120 can retrieve or otherwise obtain data including the map data 122. The map data 122 can provide detailed information about the surrounding environment of the vehicle 102. For example, the map data 122 can provide information regarding: the identity and location of different roadways, road segments, buildings, or other items or objects (e.g., lampposts, crosswalks and/or curb); the location and directions of traffic lanes (e.g., the location and direction of a parking lane, a turning lane, a bicycle lane, or other lanes within a particular roadway or other travel way and/or one or more boundary markings associated therewith); traffic control data (e.g., the location and instructions of signage, traffic lights, or other traffic control devices); and/or any other map data that provides information that assists the vehicle computing system 112 in processing, analyzing, and perceiving its surrounding environment and its relationship thereto.

The vehicle computing system 112 can include a positioning system 118. The positioning system 118 can determine a current position of the vehicle 102. The positioning system 118 can be any device or circuitry for analyzing the position of the vehicle 102. For example, the positioning system 118 can determine position by using one or more of inertial sensors, a satellite positioning system, based on IP/MAC address, by using triangulation and/or proximity to network access points or other network components (e.g., cellular towers and/or Wi-Fi access points) and/or other suitable techniques. The position of the vehicle 102 can be used by various systems of the vehicle computing system 112 and/or provided to one or more remote computing devices (e.g., the operations computing system 104 and/or the remote computing device 106). For example, the map data 122 can provide the vehicle 102 relative positions of the surrounding environment of the vehicle 102. The vehicle 102 can identify its position within the surrounding environment (e.g., across six axes) based at least in part on the data described herein. For example, the vehicle 102 can process the autonomy sensor data 116 (e.g., LIDAR data, camera data) to match it to a map of the surrounding environment to get an understanding of the vehicle's position within that environment (e.g., transpose the vehicle's position within its surrounding environment).

The autonomy computing system 120 can include a perception system 124, a prediction system 126, a motion planning system 128, and/or other systems that cooperate to perceive the surrounding environment of the vehicle 102 and determine a motion plan for controlling the motion of the vehicle 102 accordingly. For example, the autonomy computing system 120 can receive the autonomy sensor data 116 from the one or more autonomy system sensors 114, attempt to determine the state of the surrounding environment by performing various processing techniques on the autonomy sensor data 116 (and/or other data), and generate an appropriate motion plan through the surrounding environment. The autonomy computing system 120 can control the one or more vehicle control systems 138 to operate the vehicle 102 according to the motion plan.

The perception system 124 can identify one or more objects that are proximate to the vehicle 102 (e.g., within a sensors field of view, range, etc.) based on autonomy sensor data 116 received from the autonomy system sensors 114. In particular, in some implementations, the perception system 124 can determine, for each object, state data 130 that describes a current state of such object. As examples, the state data 130 for each object can describe an estimate of the object's: current location (also referred to as position); current speed; current heading (which may also be referred to together as velocity); current acceleration; current orientation; size/footprint (e.g., as represented by a bounding shape such as a bounding polygon or polyhedron); class of characterization (e.g., vehicle class versus pedestrian class versus bicycle class versus other class); yaw rate; and/or other state information. In some implementations, the perception system 124 can determine state data 130 for each object over a number of iterations. In particular, the perception system 124 can update the state data 130 for each object at each iteration. Thus, the perception system 124 can detect and track objects (e.g., vehicles, bicycles, pedestrians, etc.) that are proximate to the vehicle 102 over time, and thereby produce a presentation of the world around a vehicle 102 along with its state (e.g., a presentation of the objects of interest within a scene at the current time along with the states of the objects).

The prediction system 126 can receive the state data 130 from the perception system 124 and predict one or more future locations and/or moving paths for each object based on such state data. For example, the prediction system 126 can generate prediction data 132 associated with each of the respective one or more objects proximate to the vehicle 102. The prediction data 132 can be indicative of one or more predicted future locations of each respective object. The prediction data 132 can be indicative of a predicted path (e.g., predicted trajectory) of at least one object within the surrounding environment of the vehicle 102. For example, the predicted path (e.g., trajectory) can indicate a path along which the respective object is predicted to travel over time (and/or the velocity at which the object is predicted to travel along the predicted path). The prediction system 126 can provide the prediction data 132 associated with the one or more objects to the motion planning system 128 and/or the decision system 150.

For example, and as described if further detail with reference to FIGS. 2-8, the vehicle computing system 112 can include a decision system 150. The decision system 150 can be included in or otherwise apart of the autonomy computing system 120. For example, in some implementations, the decision system 150 can be included in the motion planning system 128. As described in further detail below, the decision system 150 can obtain scene data 152 from one or more sub-systems of the vehicle computing system 112. For example, the scene data 152 can include sensor data 116 from one or more sensor(s) 114 onboard the vehicle 102. The scene data 152 can include state data 130 from the perception system 124. In addition, or alternatively, the scene data 152 can include prediction data 132 from the prediction system 126. For example, the prediction data 132 can be indicative of future state data. As discussed in further detail below, in some implementations, the future state data can be associated with uncertainty data 154. Uncertainty data 154, for example, can include a probability that the future state data will occur. The decision system 150 can determine one or more travel decisions based at least in part on the scene data 152 and the uncertainty data 154. For example, the decision system 150 can determine one or more viable travel decisions based on the scene data 152 and the uncertainty data 154. In some implementations, the decision system 150 can send the one or more viable travel decisions to the motion planning system 128. In addition, or alternatively, the decision system 150 can select a motion plan based at least in part on the one or more viable travel decisions.

The motion planning system 128 can determine a motion plan and generate motion plan data 134 for the vehicle 102 based at least in part on the prediction data 132 (the state data 130 and/or other data) and/or the one or more viable travel decisions determined by the decision system 150. The motion plan data 134 can include vehicle actions with respect to the objects proximate to the vehicle 102 as well as the predicted movements. For instance, the motion planning system 128 and/or the decision system 150 can implement an optimization algorithm that considers cost data associated with a vehicle action as well as other objective functions (e.g., cost functions based on speed limits, traffic lights, and/or other aspects of the environment), if any, to determine optimized variables that make up the motion plan data 134. By way of example, the motion planning system 128 can determine that the vehicle 102 can perform a certain action (e.g., pass an object) without increasing the potential risk to the vehicle 102 and/or violating any traffic laws (e.g., speed limits, lane boundaries, signage). The motion plan data 134 can include a planned trajectory, velocity, acceleration, and/or other actions of the vehicle 102.

As one example, in some implementations, the motion planning system 128 and/or the decision system 150 can determine a cost function for each of one or more candidate motion plans for the autonomous vehicle 102 based at least in part on the current locations and/or predicted future locations and/or moving paths of the objects. For example, the cost function can describe a cost (e.g., over time) of adhering to a particular candidate motion plan. For example, the cost described by a cost function can increase when the vehicle 102 approaches impact with another object and/or deviates from a preferred pathway (e.g., a predetermined travel route).

Thus, given information about the current locations and/or predicted future locations and/or moving paths of objects, the motion planning system 128 and/or the decision system 150 can determine a cost of adhering to a particular candidate pathway. The motion planning system 128 can select or determine a motion plan for the autonomous vehicle 102 based at least in part on the cost function(s). For example, a motion plan that minimizes the cost function can be selected or otherwise determined. The motion planning system 128 then can provide the selected motion plan to a vehicle controller that controls one or more vehicle controls (e.g., actuators or other devices that control gas flow, steering, braking, etc.) to execute the selected motion plan.

The motion planning system 128 can provide the motion plan data 134 with data indicative of the vehicle actions, a planned trajectory, and/or other operating parameters to the vehicle control systems 138 to implement the motion plan data 134 for the vehicle 102. For instance, the vehicle 102 can include a mobility controller configured to translate the motion plan data 134 into instructions. By way of example, the mobility controller can translate a determined motion plan data 134 into instructions for controlling the vehicle 102 including adjusting the steering of the vehicle 102 "X" degrees and/or applying a certain magnitude of braking force. The mobility controller can send one or more control signals to the responsible vehicle control component (e.g., braking control system, steering control system and/or acceleration control system) to execute the instructions and implement the motion plan data 134.

The vehicle computing system 112 can include a communications system 136 configured to allow the vehicle computing system 112 (and its one or more computing devices) to communicate with other computing devices. The vehicle computing system 112 can use the communications system 136 to communicate with the operations computing system 104 and/or one or more other remote computing devices (e.g., the one or more remote computing devices 106) over one or more networks (e.g., via one or more wireless signal connections, etc.). In some implementations, the communications system 136 can allow communication among one or more of the systems onboard the vehicle 102. The communications system 136 can also be configured to enable the autonomous vehicle to communicate with and/or provide and/or receive data and/or signals from a remote computing device 106 associated with a user, an item (e.g., an item to be picked-up for a courier service), an autonomous robot, and/or the like. The communications system 136 can utilize various communication technologies including, for example, radio frequency signaling and/or Bluetooth low energy protocol. The communications system 136 can include any suitable components for interfacing with one or more networks including, for example, one or more: transmitters, receivers, ports, controllers, antennas, and/or other suitable components that can help facilitate communication. In some implementations, the communications system 136 can include a plurality of components (e.g., antennas, transmitters, and/or receivers) that allow it to implement and utilize multiple-input, multiple-output (MIMO) technology and communication techniques.

The vehicle computing system 112 can include the one or more human-machine interfaces 140. For example, the vehicle computing system 112 can include one or more display devices located on the vehicle computing system 112. A display device (e.g., screen of a tablet, laptop, and/or smartphone) can be viewable by a user of the vehicle 102 that is located in the front of the vehicle 102 (e.g., operator's seat, etc.). Additionally, or alternatively, a display device can be viewable by a user of the vehicle 102 that is located in the rear of the vehicle 102 (e.g., a passenger seat).

Although many examples are described herein with respect to autonomous vehicles, the disclosed technology is not limited to autonomous vehicles. For instance, any vehicle may utilize the technology described herein for determining a motion plan. For example, a non-autonomous vehicle may utilize aspects of the present disclosure to determine a suggested motion plan or plan of action for an operator of the non-autonomous vehicle. Such information may be utilized by a non-autonomous vehicle, for example, to provide informational notifications, such as suggested travel actions, to an operator of the non-autonomous vehicle.

Figure 2:
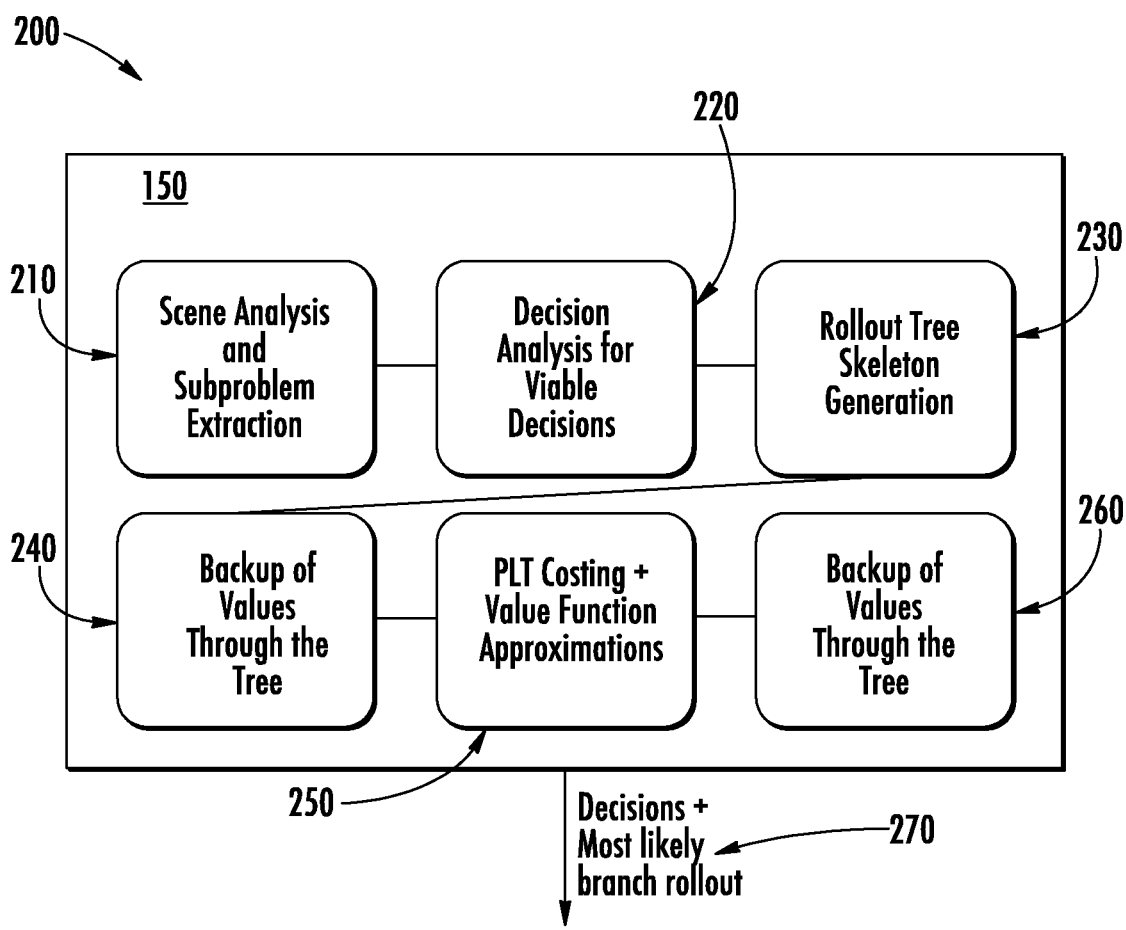
FIG. 2 depicts an example process diagram according to example implementations of the present disclosure.

FIG. 2 depicts an example process diagram 200 of an example decision system 150 (shown in FIG. 1) according to example implementations of the present disclosure. To facilitate the determination of one or more travel decisions the decision system 150 can obtain and analyze scene data 152 through scene analysis and subproblem extraction 210.

During scene analysis and subproblem extraction 210, the decision system 150 can obtain scene data 152 descriptive of one or more objects within the surrounding environment of the vehicle 102. For example, the scene data 152 can include state data 130 associated with the vehicle 102 and/or one or more objects within the surrounding environment of the vehicle 102. For instance, the decision system 150 can obtain the scene data 152 from the perception system 124 onboard the vehicle 102. In addition, or alternatively, the scene data 152 can include prediction data 126 associated with the vehicle 102 and/or one or more objects within the surrounding environment of the vehicle 102. For instance, the decision system 150 can obtain the scene data 152 from a prediction system 126 onboard the vehicle 102. The prediction data, for example, can be indicative of future state data associated with the vehicle 102 and/or one or more objects within the surrounding environment of the vehicle 102.

Figure 3:
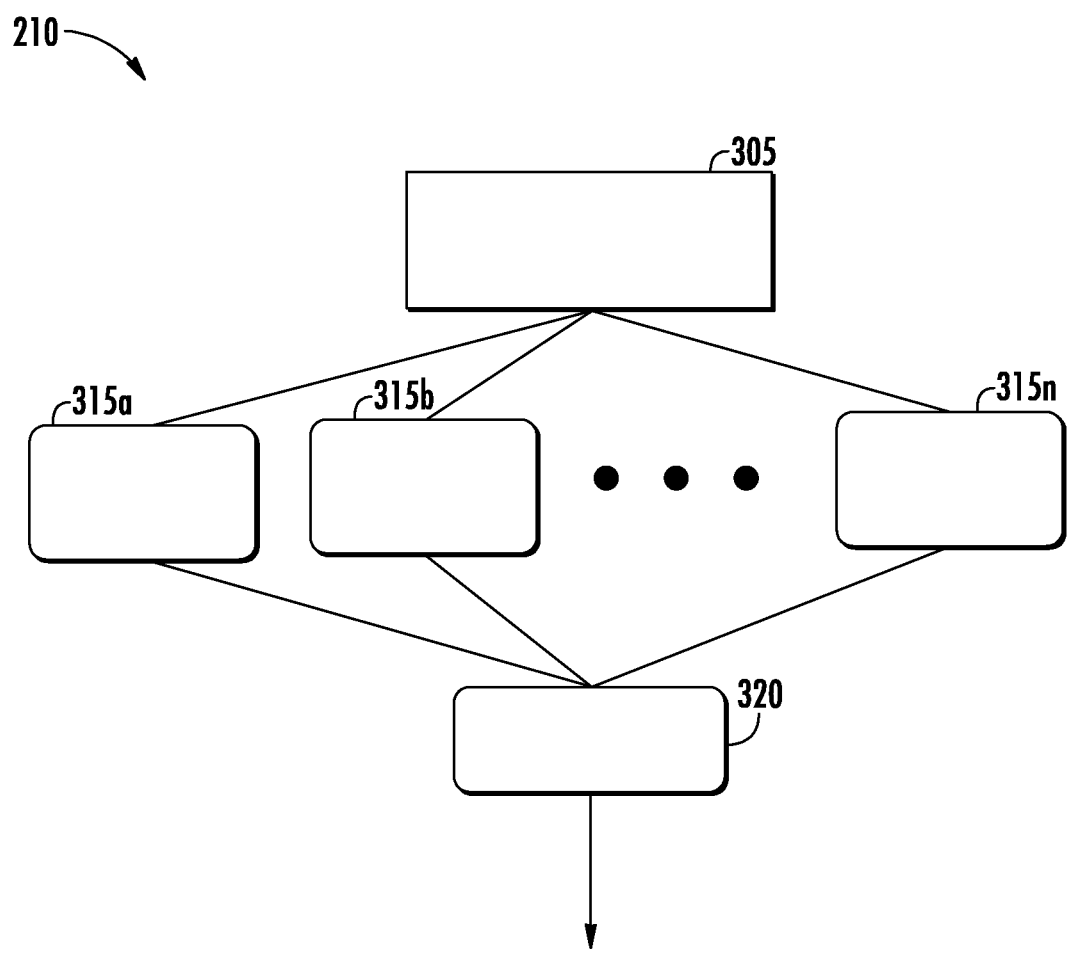
FIG. 3 depicts an example block diagram of subproblem extraction according to example implementations of the present disclosure.
Figure 4:
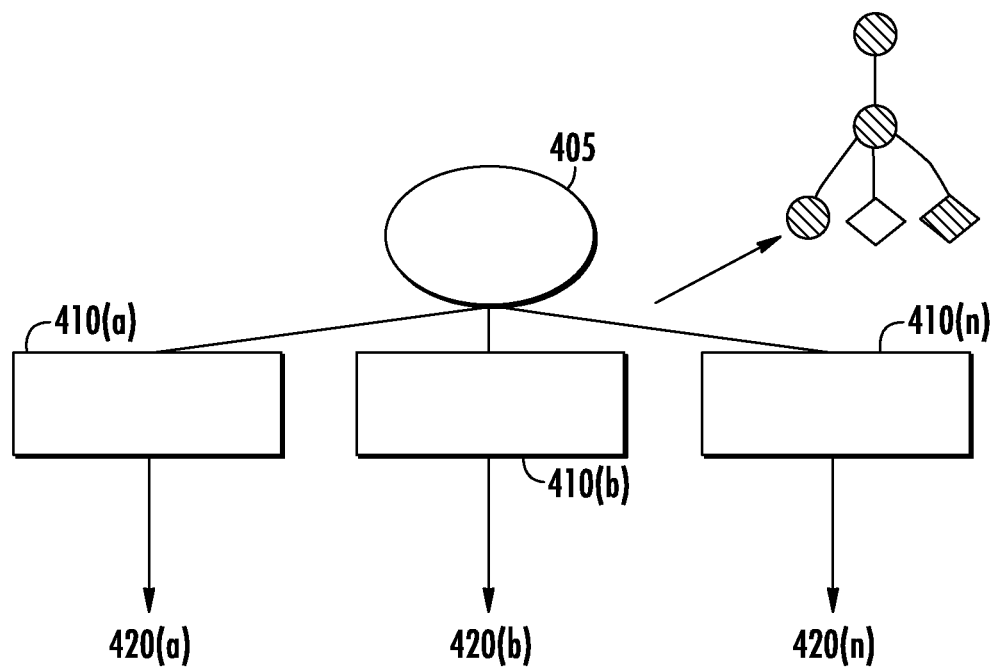
FIG. 4 depicts an example block diagram of rollout tree skeleton generation according to example implementations of the present disclosure.

The decision system 150 can analyze the scene data 152 to determine one or more subproblems based on the scene data 152. For example, and turning briefly to FIG. 3, FIG. 3 illustrates example scene analysis and subproblem extraction 210. An online scene 305 can include scene data 152 associated with the vehicle 102 and a plurality of objects. The vehicle 102 can interact with any one of the plurality of objects in a number of ways. Each interaction can be described as a subproblem (e.g., subproblem(s) 315(a-n)). More particularly, subproblems 315(a-n) can describe interactions between the vehicle 102 and at least one object within the surrounding environment of the vehicle 102. The decision system 150 can determine one or more subproblems (e.g., 315(a-n)) corresponding to at least one object within the surrounding environment of the vehicle 102. In particular, the decision system 150 can identify one or more objects within the surrounding environment of the vehicle 102 based on the scene data 152. The decision system 150 can identify one or more possible interactions between each of the one or more objects and the vehicle 102 based on scene data 152 associated with each of the one or more objects and the vehicle 102. The decision system 150 can determine one or more subproblems (e.g., subproblems 315(a-n)) based at least in part on the one or more identified interactions.

In some implementations, the one or more subproblems (e.g., 315(a-n)) can be defined over a time duration. For example, the time duration can be fixed for each subproblem (e.g., one second, etc.). In addition, or alternatively, the one or more subproblems (e.g., 315(a-n)) can be defined over a space duration. For example, a space duration can be fixed for each subproblem (e.g., one foot, etc.). As discussed in further detail below, this time or space duration can be representative of a forecast horizon. By way of example, a forecast horizon can be indicative of a time or space duration in which a vehicle 102 can reliably perceive its surrounding environment.

In some implementations, the decision system 150 can be configured to determine one or more subproblems (e.g., 315(a-n)) for each object within the surrounding environment of the vehicle 102. By way of example, the decision system 150 can identify all relevant objects within the surrounding environment of the vehicle 102. For each respective object identified, the decision system 150 can identify every possible interaction between the vehicle 102 and the respective object. The decision system 150 can determine a subproblem for each identified interaction. In this manner, the decision system 150 can break down scene data 152 into a plurality of subproblem(s) (e.g., 315(a-n)), describing every possible interaction between the vehicle 102 and each object within the surrounding environment of the vehicle 102.

In some implementations, each subproblem 315(a-n) can describe a single interaction between the vehicle 102 and a single object within the vehicle's surrounding environment. In this manner, the decision system 150 can simplify robust scene data 152 by breaking the data down into computationally simple single actor subproblems. Single actor subproblems, for example, can have low enough dimensionality to sweep over all meaningful cases offline and store the solutions. For example, in some implementations, each subproblem 315(a-n) may be associated with a pre-computed solution that can be looked up to solve the subproblem 315(a-n) without requiring substantial computing resources and/or computing time.

In this regard, solutions to the one or more subproblem(s) 315(a-n) can be previously computed, for example, before vehicle travel. More particularly, each subproblem can include one or more parameters and/or constraints associated with a particular interaction. The parameters can include problem variables, state variables, control variables, constraints, thresholds, and/or other parameters. A solution to each type of subproblem can include one or more of the parameters defined by the one or more subproblems 315(a-n). For example, each solution can be associated with determining one or more parameters of a subproblem. In addition, or alternatively, each of the one or more subproblems 315(a-n) can include one or more cost and reward functions associated with satisfying and/or violating one or more parameters and/or constraints of the respective subproblem. For example, a respective subproblem can include at least one cost function associated with satisfying and/or violating one or more constraints of the respective subproblem. Moreover, in some implementations, a respective subproblem can include at least one reward function associated with satisfying one or more parameters of the respective subproblem.

In some implementations, precomputed solutions to one or more subproblems 315(a-n) can be stored in memory onboard the vehicle 102. For example, each solution can be stored in a data structure such as a table (e.g., a lookup table, etc.). By way of example, the one or more subproblems 315(a-n) can include adaptive cruise control subproblems, push subproblems, stop guard subproblems, and speed limit subproblems. Solutions for each type of subproblem can be precomputed.

The adaptive cruise control (ACC) subproblem, for example, can define an interaction wherein the vehicle 102 follows an object traveling in front of the vehicle 102. For example, an ACC subproblem can be identified when the vehicle 102 shares a lane with another object (e.g., car, truck, bike, etc.). An ACC subproblem can include parameters such as a target speed (e.g., in meters per second, etc.), a start distance along a path (e.g., in meters, etc.), and/or a start time (e.g., in seconds, etc.). In addition, the ACC subproblem can include constraints such as a constant velocity, constant acceleration over a time duration (e.g., one second, etc.), and/or a constant distance between the vehicle and the object traveling in front of the vehicle 102. In addition, the ACC subproblem can define one or more cost functions associated with satisfying and/or violating the one or more constraints. For example, the ACC subproblem can provide a cost function associated with changing the speed and/or acceleration of the vehicle 102. As another example, the ACC subproblem can define one or more reward functions (e.g., a negative cost function) associated with satisfying one or more parameters of the ACC subproblem. For example, the ACC subproblem can provide a reward function associated with maintaining a speed and/or acceleration of the vehicle 102.

In addition, or alternatively, a push subproblem can define an interaction wherein the vehicle 102 moves to a target position by a certain point in time. The push subproblem can be identified when it can be beneficial for the vehicle 102 to pass ahead of an object by some point in time, for example, to avoid the object before it crosses the path of the vehicle 102. The push subproblem can include parameters such as a target speed (e.g., in meters per second, etc.), a start distance along a path (e.g., in meters, etc.), a start time (e.g., in seconds, etc.), a target position, and/or a target time. In some implementations, the target position can be assumed based on a target speed. Similarly, in some implementations, a target time can be assumed based on a fixed time period associated with the subproblem (e.g., one second, etc.). Moreover, the push subproblem can include constraints such as, for example, constant velocity and/or constant acceleration over a time duration (e.g., one second, etc.), and/or one or more speed/acceleration thresholds.

The push subproblem can define one or more cost functions associated with satisfying and/or violating the one or more parameters and/or constraints. For example, the push subproblem can provide a cost function associated with changing a speed and/or acceleration of the vehicle 102. As another example, the push subproblem can provide a reward function (e.g., a negative cost function) associated with maintaining a speed and/or acceleration of the vehicle 102. Moreover, the push subproblem can provide a cost function associated with decreasing a speed and/or acceleration of the vehicle 102 below a threshold (e.g., such that the vehicle 102 misses the target position) and/or increasing speed above a threshold (e.g., a speed limit, etc.).

In addition, or alternatively, a stop guard subproblem can define an interaction wherein the vehicle 102 stops at a target location. The stop guard subproblem can be identified when it can be beneficial to stop the vehicle 102 at some point in time or distance, for example, to stop for a stop sign, traffic light, pedestrian, or other suitable obstruction. The stop guard subproblem can include parameters such as a start distance along a path (e.g., in meters, etc.), target/end time (e.g., in seconds, etc.), and/or a target position (e.g., in meters, etc.). In addition, the stop guard subproblem can include constraints such as a deceleration threshold.

The stop guard subproblem can define one or more cost functions associated with satisfying and/or violating the one or more constraints. For example, the stop guard subproblem can provide a cost function associated with violating the deceleration threshold (e.g., decelerating too slowly and/or too quickly). As another example, the stop guard subproblem can provide a cost function associated with failing to stop by the end time and/or at the end position.

In addition, or alternatively, a speed limit subproblem can define an interaction wherein the vehicle 102 regulates its speed (e.g., a maximum and/or minimum speed) based on an object. For example, the speed limit subproblem can be identified when it is beneficial to limit the speed of the vehicle 102 to adhere to legal and/or safety requirements of a road segment or other travel path. The speed limit subproblem can include parameters such as a target speed (e.g., in meters per second, etc.), a start distance along a path (e.g., in meters, etc.), an end distance along a path (e.g., in meters, etc.), a start time (e.g., in seconds, etc.), and/or an end time (e.g., in seconds, etc.). In addition, the stop guard subproblem can include one or more constraints such as a minimum and/or maximum speed.

The speed limit subproblem can define one or more cost functions associated with satisfying and/or violating the one or more constraints. For example, the speed limit subproblem can provide a cost function associated with violating the minimum and/or maximum speed. As another example, the speed limit subproblem can provide a reward function (e.g., a negative cost function) associated with maintaining the speed of the vehicle 102 at the target speed.

In some implementations, each subproblem (e.g., 315($a$-$n$)) can be defined along a one-dimensional (e.g., linear, etc.) path. For example, paths traveled by the vehicle 102 can include two-dimensional features, such as, for example, curves, bends, etc. In such a case, a complex problem of two-dimensionality can be represented as a composition of one-dimensional sub-problems. In this manner, the decision system 150 can reduce the memory requirements of pre-computed solutions to the subproblems (e.g., 315($a$-$n$)). For example, representing complex problems as a composition of one-dimensional subproblems can allow the determination of a solution to the complex problem using locally stored pre-computed solutions. In addition, or alternatively, a two dimensional feature of a path traveled by the vehicle can be compared against reference paths which have pre-computed solutions to find a subproblem most similar to the two dimensional feature. Moreover, in some implementations, a two dimensional feature can be represented as speed constraints (e.g., speed constraints applied to pre-computed one-dimensional solutions, etc.).

The pre-computed solutions to the one or more subproblems 315($a$-$n$) can be adjusted based on uncertainty. For example, the pre-computed solution of a respective subproblem can be stored in a table (e.g., look-up table, etc.), with dimensions defined by some or all of the parameters of the respective subproblem. In some implementations, the decision system 150 can use continuous uncertainty to construct a kernel used for value function interpolation. For example, the interpolation kernel can define an interpolation function value as a weighted sum of values in the table. By way of example, the interpolation kernel can be chosen to satisfy one or more continuity constraints on the interpolated function. In addition, or alternatively, the interpolation kernel can be interpreted as a probability distribution over each pre-computed solution in the table. In some implementations, the decision system 150 can use some dimensions of the interpolation kernel to guarantee continuity and other dimensions to encode uncertainty. For example, a three-dimensional value function for stopping at a one or more distances from an object can use the interpolation kernel with a second-order spline interpolation on speed and acceleration, and the probability estimate of each stopping location from the continuous uncertainty on the prediction.

In addition, or alternatively, pre-computed solutions for a plurality of parameterizations of the subproblem can be weighted by a probability associated with uncertainty. For example, uncertainty can define a probability density function for the plurality of parameterizations. In such a case, the solutions can be weighted by the probability density function. For example, uncertainty can be represented by an additional parameter for the pre-computed solutions. By way of example, uncertainty can define an extra dimension in a lookup table. In this manner, the decision system can use 100% certain subproblems, sweep over those solutions using different gaussian weights, and use such solutions to get the expected answers given by the probability distribution.

Turning back to FIG. 2, the decision system 150 can determine one or more viable decisions during decision analysis for viable decisions 220. At decision analysis for viable decisions 220, the decision system 150 can identify one or more travel decisions based on scene data 152. For example, the decision system 150 can identify one or more travel decisions based on scene data 152 associated with the vehicle 102, one or more objects within the surrounding environment of the vehicle 102, and/or one or more subproblems (e.g., 315(*a*-*n*)) identified based on the scene data 152. Moreover, in some implementations, travel decisions can be identified based on travel data. Travel data, for example, can include data indicative of one or more travel constraints such as a destination, time, event, or other data associated with vehicle travel. For example, the decision system 150 can identify one or more travel decisions based on scene data 152 and a desired destination of the vehicle 102.

Travel decisions are indicative of high level instructions defining a potential action of the vehicle 102 with respect to its environment. For example, travel decisions can include instructions for the vehicle 102 to park at a destination, stop at a stoplight, pass one or more objects, merge lanes on a two lane road, etc. In some implementations, one or more of the subproblems (e.g., 315(*a*-*n*)) identified from the scene data 152 can be associated with one or more travel decisions. For example, travel decisions can be associated with the objects associated with one or more subproblems (e.g., 315(*a*-*n*)). For instance, travel decisions can include an indication of whether or not to perform an interaction with respect to an object covered by a subproblem.

By way of example, travel decisions can include one or more subproblems (e.g., 315(*a*-*n*)). For example, referencing FIG. 3, a travel decision 320 can include a combination strategy including a plurality of subproblems (e.g., 315(*a*-*n*)). By way of example, a travel decision 320 to merge into a left lane on a two lane highway can include a speed limit subproblem with respect to a speed limit object (e.g., the speed limit subproblem may be necessary to comply with a speed limit warning, etc.); a push subproblem with respect to an object located behind the vehicle 102 (e.g., the push subproblem may be necessary to pass a vehicle already in the left lane, etc.); and/or a stop guard subproblem with respect to an object located in front of the vehicle 102 (e.g., the stop guard subproblem may be necessary to slow down before reaching another vehicle already in the left lane). In addition, or alternatively, one or more travel decisions 320 can include a particular subproblem. For example, a travel decision (e.g., 320) indicative of merging into a left lane and a travel decision (e.g., 320) indicative of maintaining a travel lane can both include a speed limit subproblem with respect to the same speed limit object.

The decision system 150 can determine one or more viable travel decisions from the one or more travel decisions 320. For example, viable travel decisions can include a subset of travel decisions. By way of example, the viable travel decisions can include one or more travel decisions that are physically possible or practical. The decision system 150 can determine viable travel decisions by comparing the one or more travel decisions 320 to one or more physical constraints (e.g., by using a physics engine, etc.). More particularly, viable and/or nonviable travel decisions can be determined based on physics rules or heuristics. For example, nonviable decisions can be associated with an object at a position and/or traveling at a speed and/or a direction such that the object is unlikely or incapable of interacting with the vehicle 102 in a relevant future (e.g., within the time window of the future state data). In some implementations, nonviable decisions can be discarded. In this manner, the decision system 150 can increase the scalability of the system by eliminating nonviable travel decisions from the one or more travel decisions. For example, the number of travel decisions required for a scene with N objects and D travel decisions per object can scale as $O(D^N)$, which can require substantial computing resources to fully consider. However, by eliminating nonviable travel decisions, the decision system 150 can avoid expending computing resources on unlikely and/or physically impossible scenarios.

In some implementations, a plurality of travel decisions 320 can be grouped into one or more travel decision groups. For example, in multi-actor scenes, a travel decision associated with one object may necessitate another decision with respect to another object. In such a case, each travel decision may be grouped into a travel decision group. Thus, a travel decision group can include a plurality of travel decisions 320 that collectively account for each object within the surrounding environment of the vehicle 102. By way of example, a decision grouping can include a travel decision to (e.g., "pass," "yield," etc.) for some or all of the objects within the surrounding environment of the vehicle 102.

Turning again back to FIG. 2, the decision system 150 can generate one or more branching policies during rollout tree skeleton generation 230. At rollout tree skeleton generation 230, the decision system 150 can generate one or more branching policies based at least in part on the one or more subproblems (e.g., 315(*a*-*n*)) and/or the scene data 152. For example, each respective branching policy in the one or more branching policies can include scene data 152 associated with the vehicle 102 and/or one or more objects within the surrounding environment of the vehicle 102.

In some implementations, the one or more branching policies can include a tree-like structure with a plurality of nodes and one or more branches. Each respective node of the plurality of nodes can include data indicative of scene data 152, action data, child data, probability data, decision data, and/or uncertainty data. For example, each respective node can correspond to scene data 152 associated with the vehicle 102 and/or the one or more objects within the surrounding environment of the vehicle 102. More particularly, each respective node can correspond to one or more present and/or predicted states associated with the vehicle 102 and/or the one or more objects within the surrounding environment of the vehicle 102. By way of example, each respective node can include data indicative of the state of an autonomous vehicle relative to one or more objects such as, for example, the position of an autonomous vehicle relative to one or more objects, the speed of an autonomous vehicle relative to one or more objects, etc.

Moreover, in some implementations, each respective node in the plurality of nodes can include action data indicative of one or more actions necessary to transition the state of the vehicle 102 at the respective node to another state relative to one or more objects within the surrounding environment of the vehicle 102. For example, each respective node in the plurality of nodes can include child data indicative of one or more pointers to one or more child nodes of the plurality of nodes. The one or more child nodes can correspond to scene data 152 indicative of one or more different predicted states reachable from the state corresponding to the respective node. The action data can include data indicative of one or more recorded actions necessary to transition the vehicle 102 from a state corresponding to the respective node to at least one predicted state corresponding to at least one child node. For example, the action data can include data indicative of every action necessary to transition the vehicle 102 from the states corresponding to the respective node to a predicted state corresponding to any child node. In this manner, each branching policy can include one or more branches corresponding to a series of states associated with the one or more objects and/or the vehicle 102. Each branch can be formed by a plurality of nodes connected by pointers based on the scene data 152 corresponding to each of the plurality of nodes. Action data associated with each node in the plurality of nodes can identify actions required to traverse each branch in the one or more branching policies.

In some implementations, each respective node in the plurality of nodes can correspond to one or more travel decisions 320. For example, turning to FIG. 4, the decision system 150 can generate at least one branching policy for each of the one or more travel decisions. In some implementations, the decision system 150 can generate at least one branching policy for each travel decision (e.g., travel decisions 410($a$-$n$)) determined from the one or more travel decisions 320. In some implementations, each branching policy (e.g., 420($a$-$n$)) can correspond to a travel decision group. By way of example, each branching policy (e.g., 410($a$-$n$)) can include a series of state changes with respect to the one or more objects associated with each subproblem based at least in part on at least one travel decision 320 and/or travel decision group. For example, the decision system 150 can generate a branching policy (e.g., 420($a$-$n$)) by determining one or more predicted states or actions based, at least in part, on the one or more travel decisions 310 associated with the branching policy (e.g., 420($a$-$n$)).

In some implementations, the decision system 150 can generate an overall branching policy that evaluates every travel decision in the one or more travel decisions 320 identified from the scene data 152. For example, the overall branching policy can include a root node 405 with one or more child nodes (e.g., 410($a$-$n$)) based on one or more travel decisions 320. By way of example, in some implementations, the overall branching policy can include a root node 405 indicative of the initial state of the vehicle 102 with respect to every object within the vehicle's 102 surrounding environment. The initial state of the vehicle 102, for example, can include scene data 152 indicative of the present state of the vehicle 102 with respect to every object within the vehicle's surrounding environment.

The root node 405 can be connected to a separate node (e.g., 410($a$-$n$)) for each of the one or more travel decisions 320 identified from the scene data 152. For example, the root node 405 can include child data indicative of one or more pointers to each branching policy 420($a$-$n$) generated based on the one or more travel decisions 320. By way of illustration, FIGS. 5-7 depict example overall branching policies. Overall branching policy 500, for example, includes one travel decision. Overall branching policies 600 and 700, on the other hand, include two travel decisions. As described in further detail below, the complexity of each overall branching policy 500, 600, and 700 can be dependent on a number of decision points (e.g., decision point 505). For example, although branching policies 600 and 700 both include two travel decisions, branching policy 700 is more complex due to an increased number of decision points.

A decision point (e.g., 505) can include a temporal decision point, spatial decision point, and/or a worst case decision point. Each decision point (e.g., 505) can be indicative of a future point in time or space. By way of example, a temporal decision point can be indicative of a future point in time; a spatial decision point can be indicative of a future point in space; and a worst case decision point can be indicative of a future point in time and/or space. In some implementations, a decision point (e.g., 505) for a respective branching policy can be represented as a node of the respective branching policy. In this manner, the plurality of nodes of a branching policy can be indicative of decision points (e.g. 505) spaced along time and/or space.

In some implementations, the plurality of nodes of a respective branching policy (e.g., 420($a$-$n$)) can be spaced along time steps over some period of time. In addition, or alternatively, the plurality of nodes of a respective branching policy (e.g., 420($a$-$n$)) can be spaced along spatial steps over some distance. For example, the plurality of nodes of a respective branching policy (e.g., 420($a$-$n$)) can be spaced along time or space over a forecast horizon. A forecast horizon can be indicative of a period of time and/or a distance. The forecast horizon can be indicative of any period of time and/or distance. For example, forecast horizon can be indicative of a preset period of time and/or distance based on safety standards. By way of example, a forecast horizon can be indicative of a period of time in which the vehicle 102 can reliably implement a motion plan. In addition, or alternatively, a forecast horizon can include the furthest distance in which the vehicle's 102 sensors can reliably collect sensor data.

As described above, a respective branching policy can correspond to at least one travel decision. In some implementations, each node in the plurality of nodes of the respective branching policy can include decision data indicative of the at least one travel decision. Decision data, for example, can include data indicative of the one or more subproblems (e.g., 315($a$-$n$)) associated with the travel decision. For example, the decision data can include one or more parameters, cost functions, reward functions, etc. corresponding to one or more subproblems (e.g., 315($a$-$n$). Thus, at each node of a respective branching policy, a respective travel decision can be evaluated based on the decision data and the scene data 152 at the respective node. In some cases, however, uncertainties associated with the scene data 152 of a node corresponding to a particular time or spatial step can affect the evaluation of the travel decision 320.

Thus, in some implementations, a branching policy can branch or fork when uncertainty in the scene is reduced, for example, with respect to the at least one travel decision corresponding to the branching policy. For example, each decision point 505 can be indicative of a point in time or space where uncertainty is reduced. By way of example, each branching policy can branch or fork at each decision point 505. For example, each decision point 505 can be indicative of a time or distance at which uncertainty associated with the scene data 152 of a respective node is resolved, for example, with respect to a travel decision associated with the respective branching policy. For instance, each decision point 505 can represent a future point (e.g., point in time, number of future observations, future proximity, etc.) at which the vehicle 102 is expected to gain insight into some uncertain characteristic.

By way of example, a temporal decision point 505 can represent a future point in time at which the vehicle 102 is expected to gain insight into some uncertain characteristic. In addition, or alternatively, a spatial decision point 505 can represent a future point in space at which the vehicle 102 expects to gain insight into some uncertain characteristic. And, a worst case decision point 505 can represent a future point in time and/or space where a "worst-case" scenario is expected to be cleared before the uncertainty is resolved, similar to a resolution of uncertainty. For example, if the vehicle 102 is passing under a road sign that obscures a traffic light, there can be uncertainty associated with a state of the traffic light. The decision system 150 can expect the vehicle 102 to perceive the state of the traffic light at some future time (e.g., a time at which the vehicle 102 expects to clear the road sign), a future distance (a distance at which the vehicle 102 is expected to clear the road sign), etc. Thus, the future point at which the vehicle 102 clears the road sign can reduce the uncertainty of scene data 152 corresponding to the traffic light. This future point can be represented as a temporal and/or spatial decision point (e.g., 505) for any branching policy (e.g., 420(a-n)) corresponding to a travel decision 320 associated with a subproblem (e.g., 315(a-n)) that is affected by the state of the traffic light. Moreover, if the vehicle 102 expects to pass the traffic light before resolution of the uncertainty of the state of the traffic light, a worst case decision point can represent a time or distance before the vehicle 102 is expected to pass the traffic light. In this manner, the scene data 152 of each of the one or more branching policies (e.g., 315(a-n) can include a series of states corresponding to one or more nodes spaced along time or spatial steps over a forecast horizon.

In this way, uncertainty in a scene can be represented by a branch and/or fork in the branching policy (e.g., 420(a-n)). Nodes, for example, following each fork can correspond to resolved states of the uncertainty. For example, the nodes can correspond to the presence of an object and/or the absence of the object at a particular point in time or space. As another example, the nodes can correspond to actions of an object (e.g., left turn versus right turn, etc.) at a particular time or space. Additionally, or alternatively, a node following a fork can correspond to continued uncertainty until a future point in time (e.g., the next time step, etc.).

For example, each respective node in the plurality of nodes of a branching policy can include uncertainty data 154. Uncertainty data 154 can be indicative of the accuracy of the scene data 152 corresponding to the respective node. For example, in some cases, the present and/or the future state data can be associated with uncertainty. This can occur, for example, when the accuracy of a present and/or future state of the vehicle 102 or an object within the surrounding environment of the vehicle 102 can depend on one or more variables. In some implementations, the variables effecting the accuracy of the scene data 152 can be resolved over time and/or space. Thus, a sample space of possible solutions (e.g., in a scene) can narrow over time and/or space such that a majority of samples are eliminated. The possibility that a solution will be eliminated can be represented as one or more uncertainties associated with a particular state. By accounting for uncertainties, the decision system 150 can determine one or more travel decisions 320 based on unknown information. This, in turn, enables the decision system 150 and/or the motion planning system 128 to create and/or modify a motion plan that accounts for the uncertainties when one or more solutions are unknown.

By way of example, scene data 152 corresponding to a respective node of the plurality of nodes in a branching policy (e.g., 420(a-n)) can be associated with at least one of an aleatoric uncertainty, epistemic uncertainty, discrete uncertainty, perception uncertainty, interaction uncertainty, and/or prediction uncertainty. For example, in some cases, scene data 152 can be associated with an aleatoric uncertainty. An aleatoric uncertainty can represent an inherent noise in observations, such as present and/or the future state data. By way of example, aleatoric uncertainty can result from noise in components of a vehicle computing system 112, such as sensor noise, motion noise (e.g., resulting from movement, vibrations, etc. of an autonomous vehicle and/or of one or more components of an autonomous vehicle), transmission noise (e.g., between two components of an autonomous vehicle), and/or electrical noise. Because such uncertainties are included in the operation of electrical components, additional data collection generally does not reduce aleatoric uncertainty.

In addition, scene data 152 can be associated with an epistemic uncertainty (e.g., model uncertainty) that is representative of uncertainties regarding software model parameters. Epistemic uncertainty can represent uncertainties in model parameters defining, for example, subproblem models, physics models (e.g., physics models defining physics of the machine-learned model), or any other software model. Moreover, epistemic uncertainty can relate to uncertainty associated with which model generated is responsible for collecting particular data. Generally, epistemic uncertainty can be explained after collection of more data.

Similarly, scene data 152 can be associated with a discrete uncertainty (e.g., calibration uncertainty). A discrete uncertainty can represent a calibration between a function or distribution estimated by a software model and the function or distribution itself. For example, the discrete uncertainty can represent the accuracy of a model. In some implementations, the discrete uncertainty can be continuous. For example, the uncertainty can be associated with a loss function (e.g., of a machine-learned model).

In some implementations, scene data 152 can be associated with a perception uncertainty representative of uncertainties associated with information perceived by a vehicle computing system 112 such as, for example, sensor data 116. Perception uncertainty can be discrete (e.g., related to a type/class of object, existence of an object, presence of turn signals or brake lights, stopped or moving, etc.) and/or continuous (e.g., related to a state of an object such as shape, position, velocity, acceleration, heading, etc.). For example, perception uncertainty can be associated with occlusion. By way of example, in some cases, a portion of space surrounding a vehicle can be occluded such that the vehicle cannot obtain data relating to the occluded area. For example, the occluded area can hide objects of relevance from vehicle sensors. Thus, perception uncertainty can represent objects that were previously recognized by a vehicle but are now obscured in an occluded area.

In addition, or alternatively, perception uncertainty can be representative of data measurement uncertainties. For example, in some cases, perceived data (e.g., sensor data) can be inaccurate due to road conditions such as poor visibility resulting from darkness, fog, or other conditions can impact an accuracy of sensor data 116. Moreover, the characteristics of an object can impact the accuracy of sensor data 116. For example, darkly colored portions of vehicles can be difficult to detect with LIDAR sensors. In addition, in some implementations, perception uncertainty can represent uncertainties regarding autonomous vehicle localization. By way of example, perception uncertainty can be associated with the location of an autonomous vehicle with respect to map data 122 and/or progress along a route.

Additionally, or alternatively, perception uncertainty can represent an uncertainty regarding a future state of an object. For example, if the object is a pedestrian approaching a crosswalk, the vehicle computing system 112 may not immediately be able to identify if the pedestrian intends to cross the crosswalk or wait at the crosswalk. As another example, if the object is another vehicle approaching a fork in a road, the vehicle computing system 112 may not immediately be able to identify which path the other vehicle intends to follow. Thus, in some cases, the perception uncertainty can be resolved after further observation of the object. For example, if a vehicle appears to slow down before a predicted turn, the perception uncertainty regarding the predicted turn may be reduced. In this manner, perception uncertainties can be tied to a duration or distance. Thus, in some implementations, a perception uncertainty can be associated with a duration until the perception uncertainty is resolved.

In some implementations, scene data 152 can be associated with an interaction uncertainty representative of uncertainties regarding predicted interactions between an object and an action of the vehicle 102. For example, if the vehicle 102 and another object approach stop signs at an intersection, it can be desirable to allow the first to arrive at the intersection to proceed through the intersection first. The predicted action of the object, however, can be uncertain where the first to arrive at the intersection is unclear. Indeed, the decision of whether to wait for the other vehicle or to proceed through the intersection can be affected by an action chosen by the vehicle 102. For example, the object can be more likely to proceed through the intersection if the vehicle 102 stops. Alternatively, the object can be more likely to stop if the vehicle 102 begins to accelerate through the intersection. Thus, the future state of the object (e.g., whether the object will stop or continue through the intersection) can be associated with an interaction uncertainty associated with a possible action taken by the vehicle 102. As another example, predicted actions of other vehicles on the road can be affected by the vehicle's decision to change lanes 102. For instance, another vehicle travelling faster than the vehicle 102 that finds itself behind the vehicle 102 after a lane change may choose between decreasing speed to match a speed of the vehicle 102, maintaining its speed with the expectation that the vehicle 102 will accelerate, or changing lanes to pass the vehicle 102. Interaction uncertainties can be predicted for each future state change before the vehicle 102 decides to change lanes.

Additionally, or alternatively, scene data 152 may be associated with a prediction uncertainty representative of the accuracy of predictions made by the vehicle computing system 112 (e.g., prediction system 126). For example, prediction uncertainty can be discrete and include uncertainties associated with the goal of an object (e.g., based on a history of observations, etc.) and/or decisions of the vehicle 102 (e.g., passing or yielding, etc.). Moreover, in some implementations, prediction uncertainty can be continuous and include, for example, a distribution over a state space or a trajectory space, and/or uncertainty associated with time evolution of observed states (e.g., acceleration, velocity, position, heading, etc.).

In some implementations, the vehicle computing system 112 (e.g., the perception system 124, decision system 150, etc.) can identify one or more uncertainties and/or a duration (e.g., a time duration and/or spatial duration, etc.) until each uncertainty can be resolved. For example, an uncertainty can be resolved by attaining more accurate sensor data 116, determining accurate future state data (e.g., future locations, future status, etc.) of an object, or other suitable increase in certainty of scene data 152 corresponding to a respective node. By way of example, a time duration can include an estimate of how much time may elapse before an expected resolution of the uncertainty associated with predicted future state data. As another example, a spatial duration can include an estimate of a distance travelled before an expected resolution of an uncertainty associated with scene data 152. In addition, or alternatively, a duration can include a number of measurements or observations before an expected resolution of the uncertainty.

In some implementations, each respective branching policy of the one or more branching policies (e.g., 420(a-n)) can include one or more decision points 505 representing a point at which uncertainty associated with scene data 152 associated with the vehicle 102 and/or one or more objects in the surrounding environment of the vehicle 102 is reduced. In addition, or alternatively, some or all of the one or more decision points 505 can correspond to a point at which a travel decision can be made. For instance, the travel decision (e.g., 320) can be associated with an object associated with the scene data 152 for which uncertainty is reduced. By way of example, the travel decision 320 can be a decision to pass the object increasing the likelihood that the position of the object relative to the vehicle 102 will change.

Turning back to FIG. 2, the decision system 150 can determine one or more travel paths through each of the one or more branching policies during branch selection for motion costing (e.g., PLT costing) 240. For example, at branch selection for motion costing (e.g., PLT costing) 240, the decision system 150 can generate a plurality of candidate travel paths for each branch of a respective branching policy. In addition, the decision system 150 can identify an optimal travel path from the plurality of candidate travel paths. In some implementations, the optimal travel path can be selected for costing by a first function and the plurality of candidate travel paths can be selected for costing by a second function.

More particularly, in some implementations, the decision system 150 can generate a plurality of candidate travel paths 610(a-n) (e.g., referencing FIG. 6) for each branch (e.g., branch 605) in a branching policy (e.g., branching policy 420(a)). The decision system 150 can determine a total cost (e.g., a total probability cost) associated with each of the plurality of candidate travel paths 610(a-n). For example, in some implementations, each respective node in the plurality of nodes can include probability data. Probability data, for example, can include data indicative of a probability of the vehicle reaching the scene data 152 corresponding to the respective node. Put differently, probability data can include data indicative of the probability of reaching the respective node.

In some implementations, the decision system 150 can determine probability data for each node in the one or more branching policies (e.g., 420(a-n)). For example, the probability data can be determined based on a policy function. In some implementations, the policy function can evaluate probability data based on the uncertainty data 154 corresponding to a respective node. By way of example, probability data for a respective node can be based on the number of decision points (e.g., 505) preceding the respective node. For example, each branch or fork (e.g., at decision point 505) due to uncertainty can reduce the probability of the vehicle 102 actually ending up being in a state described by scene data 152 corresponding to the nodes after the branch and/or fork. In some circumstances, probability mass is distributed sparsely.

The decision system 150 can determine a total cost (e.g., a total probability cost) associated with each of the plurality of candidate travel paths 610(a-n). For example, the decision system 150 can determine the total cost (e.g., a total probability cost) of a respective candidate travel path in the plurality of candidate travel paths 610(a-n) based on the probability data corresponding to each node in the one or more nodes of the respective candidate travel path. For instance, the total cost associated with each respective candidate travel path in the plurality of candidate travel paths 610(*a-n*) can be indicative of a probability that the vehicle 102 will transition states according to the scene data 152 corresponding to each node in the respective candidate travel path. In this manner, the decision system 150 can determine one or more total costs (e.g., a total probability cost) for each branch (e.g., branch 605) of a branching policy (e.g., 420(*a*)). In this way, each branch (e.g., branch 605) can include a probability representing a likelihood associated with a series of states or actions based on a travel decision 320 corresponding to the branching policy (e.g., branching policy 420(*a*)).

The decision system 150 can search (e.g., iteratively search, etc.) over a motion planning space (e.g., a scene, etc.) to identify an optimal travel path from the plurality of candidate travel paths 610(*a-n*) based at least in part on the total cost (e.g., a total probability cost) associated with each of the plurality of candidate travel paths 610(*a-n*). For instance, the motion planning space can be a Frenet space and/or a cartesian space. The optimal travel path can optimize (e.g., locally optimize, etc.) a total cost (e.g., a total probability cost) associated with the branch (e.g., branch 605), as provided by one or more cost functions. For example, in some implementations, the decision system 150 can include or otherwise implement an optimization planner such as, for example, an iterative linear quadratic regulator or similar iterative solver. By way of example, each candidate travel path can include a series of states and/or a series of controls to achieve the series of states. The optimal travel path from the plurality of candidate travel paths 610(*a-n*) can include the most likely series of states and/or series of controls to achieve the series of states. For example, the optimal travel path for each branch (e.g., branch 605) in a branching policy (e.g., branching policy 420(*a*)) can include the most likely series of events based on the travel decision 320 corresponding to the branching policy (e.g., branching policy 420(*a*)) based on uncertainty.

The decision system 150 can determine one or more costs associated with each of the one or more branching policies (e.g., 420(*a-n*)) during motion costing (e.g., PLT costing) and value function approximation 250. For example, at motion costing and value function approximation 250 the decision system 150 can determine one or more costs (e.g., value costs) associated with each respective node in the plurality of nodes of each of the one or more branching policies (e.g., 420(*a-n*)). Each value cost can be indicative of the value of a travel decision (e.g., 320), for example, based on scene data 152 corresponding to the one or more nodes of a branching policy for the travel decision (e.g., 320). The decision system 150 can use the value costs associated with each respective node to evaluate the value of the one or more travel decisions (e.g., 320) corresponding to each branching policy.

For example, in some implementations, the decision system 150 can employ or otherwise include one or more cost functions that, when evaluated, provide a total cost (e.g., value cost) for a particular travel path. An optimization planner can search over a motion planning space (e.g., a vehicle state space, etc.) to identify a travel path that optimizes (e.g., locally optimizes, etc.) the total cost (e.g., value cost) provided by the one or more cost functions. Example cost functions can include a portion that provides a cost (e.g., through increased cost penalization, etc.) that discourages an autonomous vehicle from performing actions that violate or approach one or more constraints, such as travel paths that come undesirably close to objects or that implement undesired speeds and/or maneuvers. Furthermore, in some implementations, the cost function(s) can include a portion that provides a reward rather than a cost. For example, the reward can be of opposite sign to cost(s) provided by other portion(s) of the cost function. Example rewards can be provided for distance traveled, velocity, and/or other forms of progression toward completion of a route. In one example implementation, the total cost equals the sum of all costs minus the sum of all rewards and the optimization planner attempts to minimize the total cost. The cost functions can be evaluated by a penalty/reward generator.

In some implementations, the decision system 150 can determine a cost (e.g., a value cost, etc.) associated with a first portion of the one or more branches by a first process and a cost (e.g., value cost, etc.) associated with a second portion of the one or more branches by a second process. For example, in some implementations, the first process can be a computationally intensive process, such as an iterative linear quadratic regulator. Additionally, and/or alternatively, the second process can approximate the first process. For instance, the second process can be less computationally intensive than the first process while providing a similar output to the first process. For example, the second process can be a machine-learned model, such as a machine-learned function modeling the first process.

In some implementations, the first portion of each respective branch in the one or more branches can include the optimal travel path through the respective branch. Thus, the first portion of the respective branch can include a portion with a high likelihood or probability of occurring. In other words, the first portion of the respective branch can correspond to events that are likely to occur. In some implementations, the first portion (e.g., the optimal travel path, etc.) can include branches with a probability greater than a threshold, such as, for example, 50%.

The decision system 150 can utilize one or more costing functions to determine a full costing evaluation for every optimal travel path through each of the one or more branches (e.g., branch 605) of a respective branching policy (e.g., 420(*a*)). For example, in some implementations, the decision system 150 can send the optimal travel path through a nonlinear optimization strategy such as a frenet frame optimization strategy that draws discrete samples from a parametric frenet frame sampling strategy. For example, in some implementations, the scene data 152 can be represented as a Partially Observable Markov Decision Processes (POMDP). For instance, the scene data 152 can be defined in terms of parameters including a state space S, action space A, transition model T, reward function R, observation space O, and observation model Z.

The decision system 150 can determine a value cost at a respective node using a value function for a state V(s) that takes as an input state s E S and defines the total cost (V(s)) from the state s to a goal. For instance, one example value function can be defined as:

$$V(s) = \max_a \left[ R(s, a) + \sum_{s' \in S} p(s' \mid s, a) V(s') \right]$$

Similarly, the decision system 150 can determine the value cost at a respective node based on a particular action using a Q-value function. The Q-value (Q(s, a)) function can be defined as the value cost of an action a with regard to a state s. For instance, one example Q-value function can be defined as:

$$Q(s, a) = R(s, a) + \sum_{s' \in S} p(s' \mid s, a) V(s')$$

From this, a policy for scene data 152 of a respective node can be defined as a function that returns a probability distribution over actions for the respective scene data. For instance, one example policy $\pi$ can be defined as:

$$\pi(s) = \arg\max_{a} Q(s, a)$$

Applying the above costing functions, the decision system 150 can determine a value cost for every node in each optimal travel path. For example, the decision system 150 can store the total cost (V(s)), the q-value (Q(s, a)), and the policy ($\pi$). Each quantity can be used in conjunction with the one or more subproblems (e.g., 315(*a-n*)) identified for each respective node to determine a value cost for each respective node. In this manner, the decision system 150 can determine a full costing evaluation of each respective node in the plurality of nodes that make up each optimal travel path.

In some implementations, the second portion of each respective branch in the one or more branches can include one or more candidate travel paths (e.g., 610(*a-n*)) through the respective branch (e.g., branch 605) that are not identified as the optimal travel path. For example, the second portion of the respective branch (e.g., 605) can include candidate paths (e.g., 610(*a-n*)) with a low likelihood or probability of occurring. In other words, the second portion of the respective branch (e.g., 605) can correspond to events that are unlikely to occur. By way of example, in some implementations, the second portion can include candidate paths (e.g., 610(*a-n*)) with a probability less than a threshold, such as for example 50%.

The decision system 150 can utilize one or more costing functions to determine a costing approximation for every candidate travel path through each of the one or more candidate branches (e.g., 610(*a-n*)). In some implementations, the decision system 150 can utilize a value function approximation. For example, the decision system 150 can utilize a quadratic approximation from an iterative linear quadratic regulator algorithm. In addition, or alternatively, the decision system 150 can utilize a machine learned function in order to find an efficient way to query for quantities of interest. In some implementations, the value function approximation can fit within a single kernel call so that it can be used as part of the costing scene when evaluating a total cost (V(s)) for a respective node. In this manner, the decision system 150 can determine a cost (e.g., an approximation of a value cost, etc.) for each respective node in the plurality of nodes that make up each candidate travel path (e.g., 610(*a-n*)).

Approximating a portion of the one or more branches that corresponds to unlikely events can allow for several advantages. For instance, approximating a portion of the one or more branches can reduce the usage of computing resources. For example, computing resources onboard a vehicle can be limited, and in some cases, it can be desirable to reduce the use of limited computing resources (e.g., to allow the computing resources to be used for other tasks, etc.). Additionally, in cases where the portion of the one or more branches are unlikely, the approximation can serve in place of the cost (e.g., value cost) of the one or more branches for the purposes of selecting a motion plan while not adversely affecting operation of a vehicle.

The first portion and/or the second portion can be selected by any suitable method. For example, as described above, the first portion can include the optimal travel path and the second portion can include the remaining candidate travel paths. In this manner, the decision system 150 can consider each series of states based on a likelihood that the series will occur when a travel decision (e.g., 320) is made. This, in turn, can allow the decision system 150 to evaluate a travel decision (e.g., 320) with respect to every object within the surrounding environment of the vehicle 102 based on the likely effect that travel decision 320 will have on each object. In this manner, the decision system 150 can facilitate the determination of a motion plan that satisfies all the possible futures and maximizes the expected reward under the distributed events. By approximating the value cost of all possible future events and determining a full costing evaluation of likely events, the decision system 150 can create a motion plan that satisfies a worst-case scenario while preparing for the most likely scenarios.

The decision system 150 can determine a total cost (e.g., value cost, etc.) associated with each respective branching policy during backup of values through the tree 260. For example, at the operation for generating backup of values through the tree 260, the decision system 150 can determine a cost associated with each branch in a respective branching policy. In addition, or alternatively, the decision system 150 can determine a total cost associated with the respective branching policy by back-propagating values through the cost associated with each branch in the respective branching policy.

For example, in some implementations, the decision system 150 can determine a cost (e.g., a value cost, etc.) associated with each respective branch in a branching policy by determining a cost (e.g., value cost, etc.) associated with the optimal travel path for the respective branch. To do so, the decision system 150 can back-propagate the cost (e.g., a value cost, etc.) through the branching policy. For example, the branching policy can include one or more parent nodes each having one or more child nodes. As described above, a cost (e.g., a value cost, etc.) can be determined for each node of the plurality of nodes in the branching policy including, for example, each of the one or more child nodes for every parent node. The cost (e.g., a value cost, etc.) for a respective parent node can be determined as a weighted sum of the costs (e.g., a value cost, etc.) of each of the respective parent's child nodes. For example, the costs (e.g., a value cost, etc.) of the child nodes can be weighted by a probability (e.g., probability cost) associated with each of the child nodes. Thus, after the back-propagation is completed, the root node of the branching policy can represent the total cost (e.g., total value cost, etc.) of the branching policy. As discussed above, the root node of every branching policy can be representative of at least one travel decision (e.g., 320). Thus, by backpropagating the costs (e.g., a value cost, etc.) of every node in a branching policy (e.g., 420(*a-n*), the decision system 150 can determine a total cost (e.g., total value cost, etc.) for a travel decision (e.g., 320).

The decision system 150 can determine one or more costs, such as for example value costs, for each of the one or more branching policies (e.g., 420(*a-n*)) in an overall branching policy (e.g., 500, 600, 700, etc.). The cost (e.g., value cost, etc.) can indicate a general measure of desirability associated with scenarios (e.g., travel decisions 320) corresponding to each branching policy (e.g., 420(*a-n*)). For instance, the cost (e.g., value cost, etc.) can represent a cost associated with satisfying and/or violating one or more constraints defined by one or more subproblems (e.g., 315(*a-n*)) associated with a respective branching policy (e.g., 420(*a-n*)). For example, in some implementation, the cost (e.g., value cost, etc.) of a branching policy (e.g., 420(*a-n*)) can include a total cost (e.g., total value cost, etc.) to achieve a certain state based on one or more Q-values representative of the cost of one or more subproblems (e.g., (315(*a-n*))) necessary to achieve the state.

The decision system 150 can help select a motion plan based, at least in part, on the total cost (e.g., value cost, etc.) associated with each branching policy. For example, the decision system 150 can select a motion plan based at least in part on the one or more costs associated with each of the one or more branching policies (e.g., 420(*a-n*)) during decisions and most likely branch rollout 270. By way of example, at decisions and most likely branch rollout 270 the decision system 150 can determine one or more travel decisions 320 for the vehicle 102 based at least in part on the cost (e.g., value cost, etc.) associated with each branching policy (e.g., 420(*a-n*)) corresponding to each travel decision 320. The decision system 150 can generate, suggest, and/or select a motion plan based at least in part on the one or more travel decisions 320.

For example, the decision system 150 can generate a series of travel decisions 320 for navigating an uncertain scenario. By way of example, each travel decision 320 can include one or more interactions with at least one object within the surrounding environment of the vehicle 102. The decision system 150 can determine a value cost for each respective travel decision 320 based on a branching policy for each respective travel decision 320. In addition, or alternatively, the decision system 150 can determine how well the series of travel decisions 320 can be used practically in a scene of the vehicle 102.

The decision system 150 can help select the motion plan for the vehicle 102 based on the one or more costs (e.g., a value cost, etc.) associated with each of the branching policies. In addition, or alternatively, the motion plan can be selected by a remote computing system 106, such as a computing system that is not onboard the vehicle (e.g., central server connected to a plurality of vehicles, etc.). The decision system 150 (and/or a remote computing system 106) can aggregate the costs (e.g., value cost, etc.) associated with corresponding branches of each branching policy to determine a total cost associated with each branch. In some implementations, the decision system 150 can select a motion plan based on the branches of one or more of the branching policies (e.g., 420(*a-n*)) associated with the lowest total cost (e.g., a value cost, etc.).

In addition, or alternatively, in some implementations, a motion plan can be generated based at least in part on the one or more branching policies (e.g., 420(*a-n*)) for each of the one or more travel decisions 320. For example, in some implementations, a branching policy can be generated for each of one or more travel decision groups. Each travel decision group can include a plurality of travel decisions 320 that collectively account for each object within the surrounding environment of an autonomous vehicle. In some implementations, the motion planning system 128 can generate the motion plan based on the travel decision group associated with at least one branching policy.

In some cases, an interaction between an object and the vehicle 102, such as an interaction described by one or more subproblems (e.g., 315(*a-n*)), can affect the decisions of the object. This, in turn, can affect the desirability of one or more travel decisions 320 for the vehicle 102. For example, the desirability for the vehicle 102 to yield to an object can be affected by decisions of the object and, consequently, any action by the vehicle 102 that affects a decision of the object. Thus, in some implementations, the decision system 150 can generate a branching policy for each object interacting with the vehicle 102 based on an estimated travel decision by the vehicle 102. For example, the decision system 150 can generate a branching policy for each respective interacting object within the surrounding environment of the vehicle 102 and determine a potential travel decision for each respective object based on an action taken by the vehicle 102. Each potential travel decision for each respective object can be compared against the overall branching policy for the vehicle 102. For example, each of the one or more branching policies for the vehicle 102 can be configured to plan against each potential travel decision for each respective object. In addition, or alternatively, the branching policies for each respective object can be updated for each new vehicle travel decision and/or branching policy. The decision system 150 can repeat this process until convergence.

In addition, or alternatively, the decision system 150 can determine a travel decision (e.g., 320) for each object within the surrounding environment of the vehicle 102, then plan for a future time period (e.g., half a second, etc.) based on each travel decision (e.g., 320), simulate the future state at the end of the future time period for each object and the vehicle 102, and generate new branching policies for each object at the new state. For example, the decision system 150 can generate a branching policy for each object in the surrounding environment of the vehicle 102 based on the current state of the vehicle 102 at a first time step. The decision system 150 can generate a motion plan for a second time step after the first time step (e.g., a half-second after the first time step, etc.) with a set of constraints and forward simulator for both the vehicle 102 and the one or more objects within the surrounding environment of the vehicle 102. The decision system 150 can update each branching policy for each object by generating a new branching policy from each object's predicted state at the second time step and the predictive state of the vehicle 102 at the second time step. This can include, for example, generating two new nominal branching policies. The decision system 150 can repeat this process until the end of a forecast horizon.

In this manner, the decision system 150 can select and/or generate a motion plan that accounts for possible interactions with every object within the surrounding environment of the vehicle 102. In some implementations, the motion plan can be implemented to navigate a vehicle (e.g., a fully autonomous vehicle, partially autonomous vehicle, etc.). For example, the decision system 150 can provide the motion plan to the motion planning system 128 for use in controlling a motion of the vehicle 102. For instance, in some implementations, one or more control actions can be determined based on the motion plan. In some implementations, the one or more control actions can be implemented by the vehicle 102 (e.g., by a vehicle controller, etc.) to navigate the vehicle 102.

Figure 8:
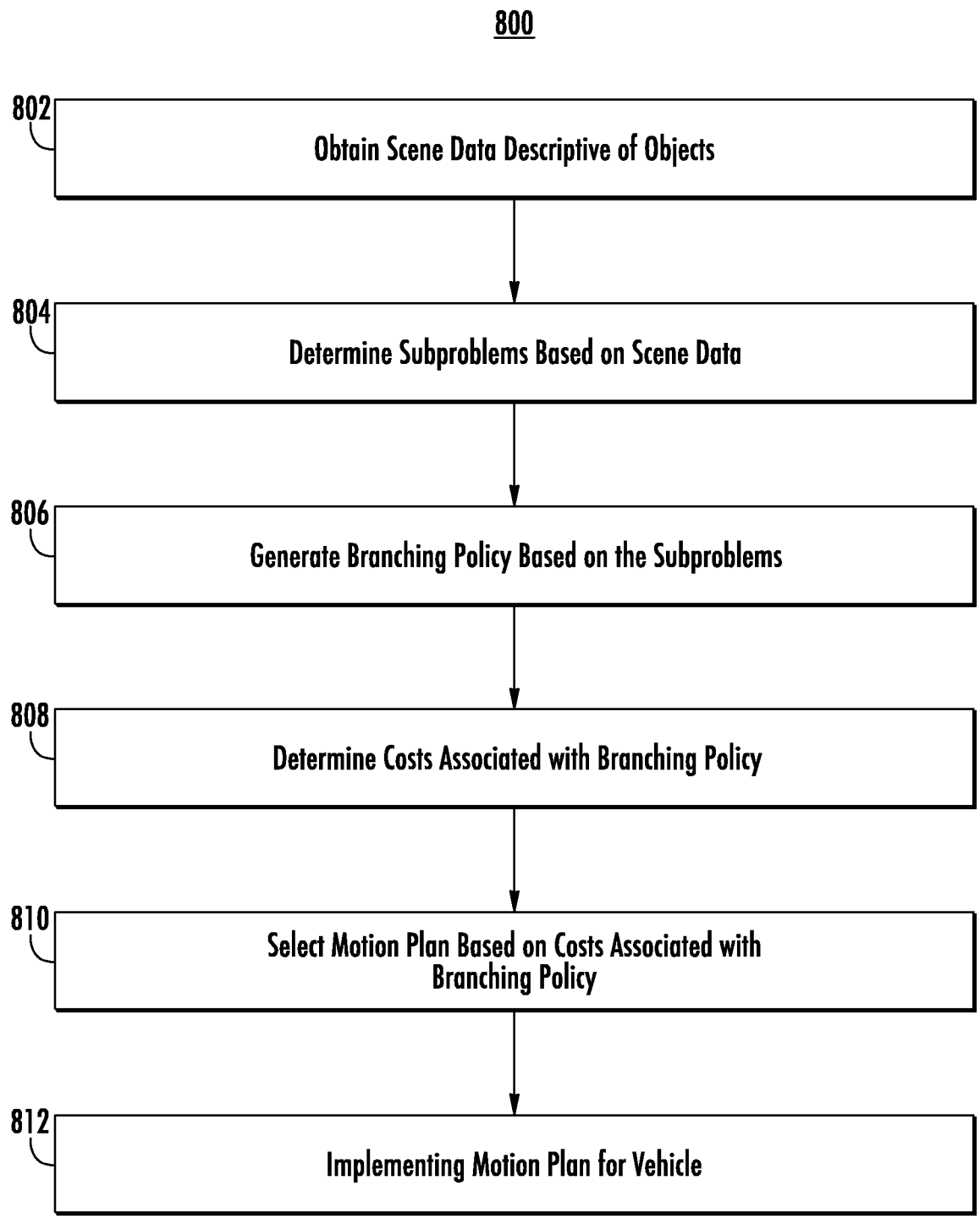
FIG. 8 depicts a flow diagram of an example method for generating navigation planning decisions according to example implementations of the present disclosure.

FIG. 8 depicts an example flow diagram of an example method 800 for autonomous vehicle motion planning according to example implementations of the present disclosure. One or more portion(s) of the method 800 can be implemented by a computing system that includes one or more computing devices such as, for example, the computing systems described with reference to the other figures (e.g., the vehicle computing system 100, the decision system 185, the operations computing system 195, etc.). Each respective portion of the method 800 can be performed by any (or any combination) of one or more computing devices. Moreover, one or more portion(s) of the method 800 can be implemented as an algorithm on the hardware components of the device(s) described herein (e.g., as in FIGS. 1 and/or 9), for example, to provide a motion plan based on uncertain data. FIG. 8 depicts elements performed in a particular order for purposes of illustration and discussion. Those of ordinary skill in the art, using the disclosures provided herein, will understand that the elements of any of the methods discussed herein can be adapted, rearranged, expanded, omitted, combined, and/or modified in various ways without deviating from the scope of the present disclosure. FIG. 8 is described with reference to elements/terms described with respect to other systems and figures for exemplary illustrated purposes and is not meant to be limiting. One or more portions of method 800 can be performed additionally, or alternatively, by other systems.

At (802), the method 800 can include obtaining scene data descriptive of objects. For example, a computing system (e.g., the vehicle computing system 112, decision system 150, etc.) can obtain scene data 152 descriptive of one or more objects within the surrounding environment of an autonomous vehicle (e.g., vehicle 102). For example, the scene data 152 can include state data for the one or more objects within the surrounding environment of the autonomous vehicle. The state data for each of the one or more objects, for example, can include data describing the object's location, speed, acceleration, heading, orientation, size, class, or status. Moreover, in some implementations, the computing system can identify one or more uncertainties associated with the scene data 152. For example, each uncertainties can be indicative of an unknown variable of the scene data 152 at a given time or point.

At (804), the method 800 can include determining one or more subproblems based on the scene data 152. For instance, a computing system (e.g., the vehicle computing system 112, the decision system 150, etc.) can determine one or more subproblems based at least in part on the scene data. In some implementations, each of the one or more subproblems (e.g., subproblems 315(a-n)) can correspond to at least one object within the surrounding environment of the autonomous vehicle. For example, each of the one or more subproblems can be associated with an interaction between the autonomous vehicle and at least one object within the surrounding environment of the autonomous vehicle.

At (806), the method 800 can include generating one or more branching policies based on the subproblems. For instance, a computing system (e.g., the vehicle computing system 112, the decision system 150, etc.) can generate one or more branching policies based on the subproblems. In some implementations, each of the one or more branching policies (e.g., 420(a-n)) can include scene data 152 associated with the autonomous vehicle and one or more objects within the surrounding environment of the autonomous vehicle. For example, in some implementations, the computing system can identify one or more travel decisions (e.g., travel decision 320) for navigating the surrounding environment of the autonomous vehicle based on the scene data 152. For example, the computing system can identify the one or more travel decisions based at least in part on the scene data 152 and the one or more subproblems.

The computing system can generate one or more branching policies for each of the one or more travel decisions. For example, the computing system can identify one or more travel decision groups based at least in part on the one or more travel decisions. For example, a travel decision group can include one or more related travel decisions. By way of example, each travel decision group can include a plurality of travel decisions that collectively account for each object within the surrounding environment of the autonomous vehicle. In addition, or alternatively, the computing system can identify one or more viable travel decisions from the one or more travel decisions. The computing system can generate a branching policy for each of the one or more travel decisions, travel decision groups, and/or viable travel decisions.

In some implementations, each branching policy can include a tree-like structure with a plurality of nodes and a plurality of branches. The plurality of nodes can correspond to one or more present and/or predicted states or actions. For example, in some implementations, each respective node in the plurality of nodes can correspond to one or more states or actions associated with the autonomous vehicle and/or the one or more objects within the surrounding environment of the autonomous vehicle. For instance, each respective node can correspond to one or more states associated with the autonomous vehicle relative to one or more objects within the surrounding environment of the autonomous vehicle. By way of example, the one or more present and/or predicted states or actions can be determined based at least in part on the one or more travel decisions associated with a respective branching policy.

In some implementations, each branching policy can include one or more decision points (e.g., decision point 505) representing a point at which uncertainty associated with the scene data 152 associated with the autonomous vehicle or one or more objects in the surrounding environment of the autonomous vehicle is reduced. For example, in some implementations, each decision point can include a future point in time. By way of example, the scene data 152 of each of the one or more branching policies can include a series of states spaced along time steps over a period of time such as, for example, forecast horizon.

At (808), the method 800 can include determining costs associated with each of the one or more branching policies. For instance, a computing system (e.g., vehicle computing system 112, decision system 150, etc.) can determine costs associated with each of the one or more branching policies. For example, the computing system can determine a cost associated with each branch in a respective branching policy. In some implementations, the computing system can determine a total cost associated with the respective branching policy by back-propagating values through the cost associated with each branch in the respective branching policy.

For example, in some implementations, the computing system can generate a plurality of candidate travel paths (e.g., candidate travel paths 610a-610n) for each branch in a respective branching policy. The computing system can determine a likelihood associated with each of the plurality of candidate travel paths. In addition, the computing system can identify an optimal travel path based at least in part on the likelihood associated with each of the plurality of candidate travel paths. For example, the optimal travel path can include a plurality of nodes from a branching policy that is most likely to occur. In some implementations, the computing system can determine the cost for each respective branch based at least in part on the optimal travel path identified for the respective branch.

At (810), the method 800 can include selecting a motion plan based on the costs associated with each of the one or more branching policies. For instance, a computing system (e.g., the vehicle computing system 112, decision system 150, etc.) can select a motion plan based on the costs associated with each of the one or more branching policies. For example, the computing system can generate a motion plan based at least in part on the one or more branching policies for each of the one or more travel decisions. Moreover, in some implementations, the computing system can generate a motion plan based at least in part on a travel decision group associated with at least one branching policy.

At (812), the method 800 can include implementing the motion plan for the autonomous vehicle. For instance, a computing system (e.g., the vehicle computing system 112, decision system 150, etc.) can implement the motion plan for the autonomous vehicle. For example, the computing system can provide the motion plan to a vehicle interface that can translate the motion plan into control instructions for the autonomous vehicle for use in controlling the motion of the autonomous vehicle. The control instructions can include, for example, steering instructions (e.g., degree, angle, percentage, direction, etc.), acceleration instructions (e.g., increase/decrease throttle amounts, percentages, etc.), braking instructions (e.g., amount/percentage of brake force, etc.).

Figure 9:
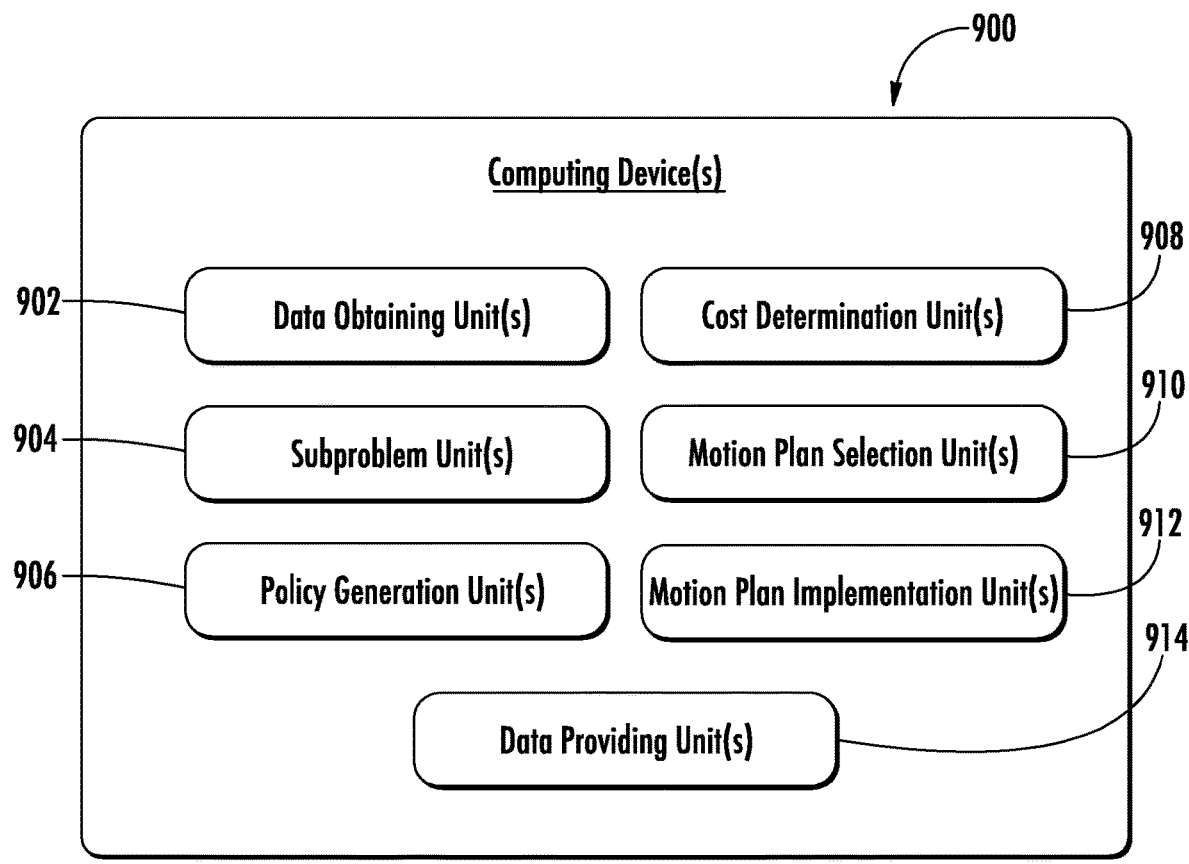
FIG. 9 depicts example units associated with a computing system for performing operations and functions according to example implementations of the present disclosure.

Various means can be configured to perform the methods and processes described herein. For example, FIG. 9 depicts an example system 900 that includes various means according to example embodiments of the present disclosure. The computing system 900 can be and/or otherwise include, for example, the decision system. The computing system 900 can include data obtaining unit(s) 902, subproblem unit(s) 904, policy generation unit(s) 906, cost determination unit(s) 908, motion plan selection unit(s) 910, motion plan selection unit(s) 912, data providing unit(s) 914, and/or other means for performing the operations and functions described herein. In some implementations, one or more of the units may be implemented separately. In some implementations, one or more units may be a part of or included in one or more other units. These means can include processor(s), microprocessor(s), graphics processing unit(s), logic circuit(s), dedicated circuit(s), application-specific integrated circuit(s), programmable array logic, field-programmable gate array(s), controller(s), microcontroller(s), and/or other suitable hardware. The means can also, or alternately, include software control means implemented with a processor or logic circuitry for example. The means can include or otherwise be able to access memory such as, for example, one or more non-transitory computer-readable storage media, such as random-access memory, read-only memory, electrically erasable programmable read-only memory, erasable programmable read-only memory, flash/other memory device(s), data registrar(s), database(s), and/or other suitable hardware.

The means can be programmed to perform one or more algorithm(s) for carrying out the operations and functions described herein. For instance, the means (e.g., the data obtaining unit(s) 902) can be configured to obtain sensor data associated with a surrounding environment of a first vehicle (e.g., from one or more sensors onboard the first vehicle). As described herein, the sensor data can be indicative of a variety of information such as, for example, scene data 152 descriptive of one or more objects within the surrounding environment of the vehicle.

The means (e.g., the subproblem unit(s) 904) can determine one or more subproblems. For example, the means (e.g., the subproblem unit(s) 904) can be configured to determine one or more subproblems (e.g., subproblems 315(a-n)) based on the scene data 152. For example, the one or more subproblems can correspond to at least one object within the surrounding environment of the first vehicle. By way of example, each subproblem can describe a potential interaction between the first vehicle and one or more objects within the surrounding environment of the first vehicle.

The means (e.g., policy generation unit(s) 906) can generate one or more branching policies. For example, the means (e.g., policy generation unit(s) 906) can be configured to generate one or more branching policies (e.g., branching policies 420(a-n)) based on the scene data 152. For example, the means (e.g., policy generation unit(s) 906) can generate one or more branching policies for each travel decision (e.g., travel decision 320) identified from the scene data 152. By way of example, each of the one or more branching policies can include scene data 152 associated with the first vehicle and one or more objects within the surrounding environment of the vehicle.

The means (e.g., cost determination unit(s) 908) can determine one or more costs. For example, the means (e.g., cost determination unit(s) 908) can be configured to determine one or more costs associated with each of the one or more branching policies. For example, the means can be configured to determine a cost associated with each branch in a respective branching policy and determine a total cost associated with a respective branching policy by back-propagating values through the cost associated with each branch in the respective branching policy.

The means (e.g., motion plan selection unit(s) 910) can select a motion plan. For example, the means (e.g., motion plan selection unit(s) 910) can be configured to select a motion plan based on the one or more branching policies. By way of example, the means can select a motion plan based at least in part on the one or more costs associated with each of the one or more branching policies. The means (e.g., motion plan implementation unit(s) 912) can be configured to implement the motion plan. For example, the means can be configured to implement the motion plan to control a motion of the first vehicle (e.g., vehicle 102, etc.). Moreover, the means can be configured to provide the motion plan to one or more means for controlling the motion of the vehicle (e.g., vehicle 102, etc.).

These described functions of the means are provided as examples and are not meant to be limiting. The means can be configured for performing any of the operations and functions described herein.

Figure 10:
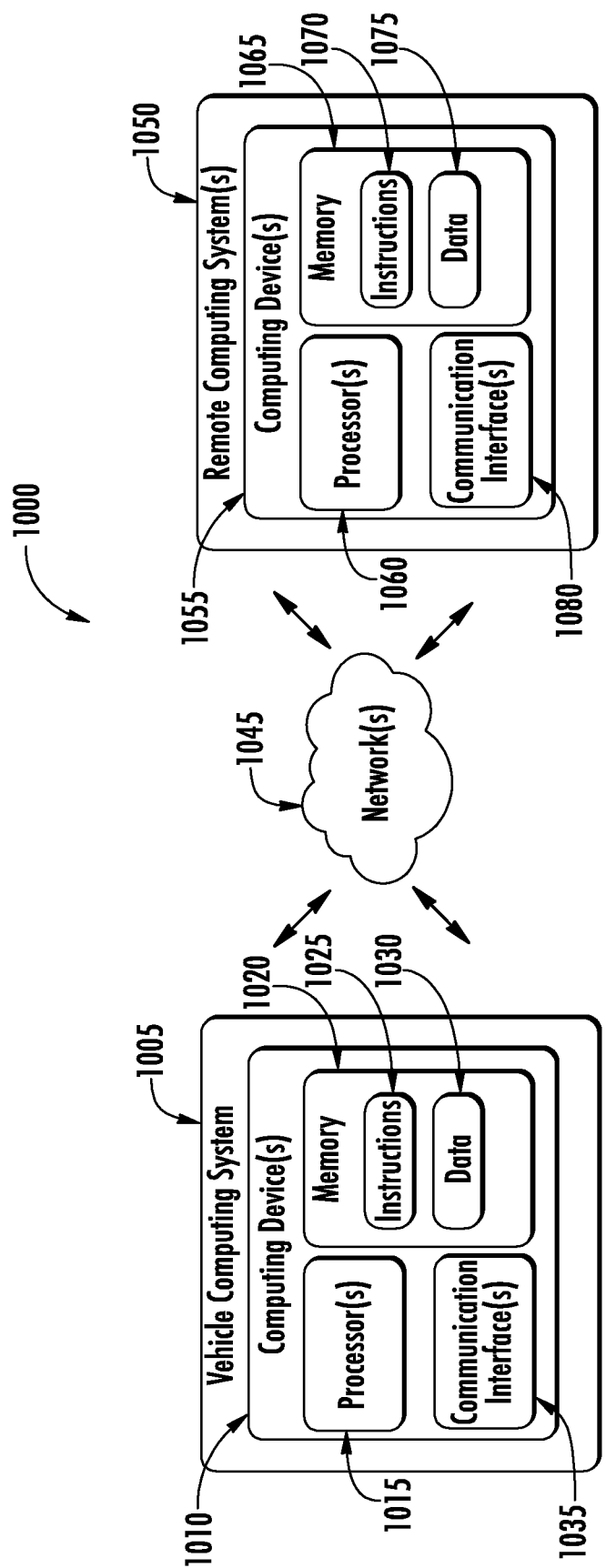
FIG. 10 depicts a block diagram of an example computing system according to example implementations of the present disclosure.

FIG. 10 depicts example system components of an example system 1000 according to example implementations of the present disclosure. The example system 1000 illustrated in FIG. 10 is provided as an example only. The components, systems, connections, and/or other aspects illustrated in FIG. 10 are optional and are provided as examples of what is possible, but not required, to implement the present disclosure. The example system 1000 can include a vehicle computing system 1005 (e.g., decision system 150, motion planning system 128, etc.) and a remote computing system 1050 that are communicatively coupled over one or more network(s) 1045. As described herein, the vehicle computing system 1005 can be implemented onboard a vehicle (e.g., as a portion of the vehicle computing system 112) and/or can be remote from a vehicle (e.g., as a portion of an operations computing system 104). In either case, a vehicle computing system 1005 can utilize the operations and model(s) of the decision system 150 (e.g., locally, via wireless network communication, etc.).

The vehicle computing system 1005 can include one or computing device(s) 1010. The computing device(s) 1010 of the vehicle computing system 1005 can include processor(s) 1015 and a memory 1020. The one or more processor(s) 1015 can be any suitable processing device (e.g., a processor core, a microprocessor, an ASIC, a FPGA, a controller, a microcontroller, etc.) and can be one processor or a plurality of processors that are operatively connected. The memory 1020 can include one or more non-transitory computer-readable storage media, such as RAM, ROM, EEPROM, EPROM, one or more memory devices, flash memory devices, etc., and/or combinations thereof.

The memory 1020 can store information that can be obtained by the one or more processor(s) 1015. For instance, the memory 1020 (e.g., one or more non-transitory computer-readable storage mediums, memory devices, etc.) can include computer-readable instructions 1025 that can be executed by the one or more processors 1015. The instructions 1025 can be software written in any suitable programming language or can be implemented in hardware. Additionally, or alternatively, the instructions 1025 can be executed in logically and/or virtually separate threads on processor(s) 1015.

For example, the memory 1020 can store instructions 1025 that when executed by the one or more processors 1015 cause the one or more processors 1015 (e.g., of the vehicle computing system 1005) to perform operations such as any of the operations and functions of the vehicle computing system 112, the decision system 150, etc. and/or for which the vehicle computing system 112, the decision system 150, etc. is configured, as described herein. For example, the vehicle computing system 1005 can be configured to perform the operations of the vehicle computing system 112, the decision system 150, and/or any of the methods or means described herein.

The memory 1020 can store data 1030 that can be obtained (e.g., received, accessed, written, manipulated, generated, created, stored, etc.). The data 1030 can include, for instance, sensor data, scene data 152, uncertainty data 154, state data, map data 134, data indicative of one or more subproblems (e.g., 315(*a-n*)), data indicative of one or more travel decisions (e.g., 320), data indicative of one or more branching policies (e.g., 420(*a-n*)), data indicative of machine-learned model(s), output data, and/or other data/information described herein. In some implementations, the computing device(s) 1010 can obtain data from one or more memories that are remote from the vehicle computing system 1005.

The computing device(s) 1010 can also include a communication interface 1035 used to communicate with one or more other system(s) (e.g., other systems onboard and/or remote from a vehicle, the other systems of FIG. 10, etc.). The communication interface 1035 can include any circuits, components, software, etc. for communicating via one or more networks (e.g., 1045). In some implementations, the communication interface 1035 can include, for example, one or more of a communications controller, receiver, transceiver, transmitter, port, conductors, software and/or hardware for communicating data/information.

The remote computing system 1050 can include one or more computing device(s) 1055. The computing device(s) 1055 can include one or more processors 1060 and at least one memory 1065. The one or more processors 1060 can be any suitable processing device (e.g., a processor core, a microprocessor, an ASIC, a FPGA, a controller, a microcontroller, etc.) and can be one processor or a plurality of processors that are operatively connected. The memory 1065 can include one or more tangible, non-transitory computer-readable storage media, such as RAM, ROM, EEPROM, EPROM, one or more memory devices, flash memory devices, data registers, etc., and combinations thereof.

The memory 1065 can store information that can be accessed by the one or more processors 1060. For instance, the memory 1065 (e.g., one or more tangible, non-transitory computer-readable storage media, one or more memory devices, etc.) can include computer-readable instructions 1070 that can be executed by the one or more processors 1060. The instructions 1070 can be software written in any suitable programming language or can be implemented in hardware. Additionally, or alternatively, the instructions 1070 can be executed in logically and/or virtually separate threads on processor(s) 1060.

For example, the memory 1065 can store instructions 1070 that when executed by the one or more processors 1060 cause the one or more processors 1060 to perform operations such as any of the operations and functions of the vehicle computing system 1005, the remote computing system 1050, and/or computing device(s) 1055, or for which any of these computing systems are configured, as described herein. For example, the processors 1060 can be configured to perform any of the operations and function of the decision system 150, one or more portions of the method 800 as described herein, and/or any other operations and functions described herein.

The memory 1065 can store data 1075 that can be obtained and/or stored. The data 1075 can include, for instance, scene data 152 (e.g., sensor data 116, state data 130, prediction data 132, uncertainty data 154, etc.), data associated with one or more travel decisions (e.g., subproblem data, branching policy data, etc.), and/or other data/information as described herein. In some implementations, the computing device(s) 1055 can obtain data from one or more memories that are remote from the remote computing system 1050.

The computing device(s) 1055 can also include a communication interface 1080 used to communicate with one or more other system(s) (e.g., the vehicle computing system 1005, etc.). The communication interface 1080 can include any circuits, components, software, etc. for communicating via one or more networks (e.g., network(s) 1045). In some implementations, the communication interface 1080 can include, for example, one or more of a communications controller, receiver, transceiver, transmitter, port, conductors, software, and/or hardware for communicating data.

The network(s) 1045 can be any type of network or combination of networks that allows for communication between devices. In some embodiments, the network(s) 1045 can include one or more of a local area network, wide area network, the Internet, secure network, cellular network, mesh network, peer-to-peer communication link and/or some combination thereof and can include any number of wired or wireless links. Communication over the network(s) 1045 can be accomplished, for instance, via a network interface using any type of protocol, protection scheme, encoding, format, packaging, etc.

Computing tasks discussed herein as being performed at computing device(s) remote from an autonomous vehicle can instead be performed at the vehicle (e.g., via the vehicle computing system 1005), or vice versa. Such configurations can be implemented without deviating from the scope of the present disclosure. The use of computer-based systems allows for a great variety of possible configurations, combinations, and divisions of tasks and functionality between and among components. Computer-implemented operations can be performed on a single component or across multiple components. Computer-implemented tasks and/or operations can be performed sequentially or in parallel. Data and instructions can be stored in a single memory device or across multiple memory devices.

While the present subject matter has been described in detail with respect to specific example embodiments and methods thereof, it will be appreciated that those skilled in the art, upon attaining an understanding of the foregoing can readily produce alterations to, variations of, and equivalents to such embodiments. Accordingly, the scope of the present disclosure is by way of example rather than by way of limitation, and the subject disclosure does not preclude inclusion of such modifications, variations and/or additions to the present subject matter as would be readily apparent to one of ordinary skill in the art.

What is claimed is:

1. A method for autonomous vehicle motion planning, the method comprising:
   obtaining scene data descriptive of one or more objects within a surrounding environment of an autonomous vehicle;
   determining a plurality of subproblems from the scene data, wherein a subproblem of the plurality of subproblems corresponds to a potential interaction of the autonomous vehicle with an object of the one or more objects within the surrounding environment of the autonomous vehicle, wherein the subproblem is associated with a precomputed solution comprising a function that governs the potential interaction;
   generating a branching policy based at least in part on the plurality of subproblems, wherein the branching policy comprises a plurality of nodes, and wherein a node of the plurality of nodes corresponds to a travel decision and is indicative of the potential interaction with the object within the surrounding environment of the autonomous vehicle;
   determining a cost for the branching policy using the precomputed solution associated with the subproblem;
   selecting the travel decision based at least in part on the cost for the branching policy; and
   initiating a motion of the autonomous vehicle based at least in part on the travel decision.

2. The method of claim 1, wherein the travel decision is indicative of a discrete vehicle action with respect to the surrounding environment of the autonomous vehicle, wherein generating the branching policy further comprises:
   determining that the travel decision is viable based on the scene data and a physical constraint associated with the autonomous vehicle; and
   generating the branching policy for the travel decision in response to the determination that the travel decision is viable.

3. The method of claim 1, wherein the node corresponds to one or more states or actions associated with the autonomous vehicle or the one or more objects within the surrounding environment of the autonomous vehicle.

4. The method of claim 3, wherein the node corresponds to a predicted state or a predicted action.

5. The method of claim 4, wherein the predicted state or the predicted action is determined based at least in part on the travel decision.

6. The method of claim 1, wherein the branching policy further comprises a decision point representing a point at which uncertainty associated with the scene data is reduced.

7. The method of claim 6, wherein the decision point comprises a future point in time.

8. The method of claim 1, wherein the plurality of nodes of the branching policy form a plurality of branches, and wherein determining the cost for the branching policy comprises:
   determining a branch cost for each of the plurality of branches; and
   determining the cost for the branching policy by aggregating the branch cost for each of the plurality of branches.

9. The method of claim 1, wherein the plurality of nodes of the branching policy form a plurality of branches, wherein determining the cost for the branching policy comprises:
   generating a plurality of candidate travel paths for a branch of the plurality of branches;
   determining a total cost associated with at least one of the plurality of candidate travel paths;
   identifying an optimal travel path for the branch based at least in part on the total cost associated with the at least one of the plurality of candidate travel paths; and
   determining the cost for the branching policy based at least in part on the optimal travel path identified for the branch.

10. A computing system, comprising:
    one or more processors; and
    one or more memories including instructions that, when executed by the one or more processors, cause the one or more processors to perform operations, the operations comprising:
    obtaining scene data descriptive of one or more objects within a surrounding environment of an autonomous vehicle;
    determining a plurality of subproblems from the scene data, wherein a subproblem of the plurality of subproblems corresponds to a potential interaction of the autonomous vehicle with an object of the one or more objects within the surrounding environment of the autonomous vehicle, wherein the subproblem is associated with a precomputed solution comprising a function that governs the potential interaction;
    identifying a travel decision based at least in part on the scene data and plurality of subproblems, wherein the travel decision is indicative of a discrete vehicle action with respect to the surrounding environment of the autonomous vehicle;
    generating a branching policy based on the subproblem and the travel decision, wherein the branching policy comprises a plurality of nodes, wherein a node of the plurality of nodes is indicative of the potential interaction with the object within the surrounding environment of the autonomous vehicle;
    determining a cost for the branching policy using the precomputed solution associated with the subproblem;
    selecting the travel decision based on the cost for the branching policy at least in part; and
    initiating a motion of the autonomous vehicle based at least in part on the travel decision.

11. The computing system of claim 10, further comprising:
    identifying one or more travel decision groups based at least in part on the travel decision; and
    generating the branching policy based on the one or more travel decision groups.

12. The computing system claim 11, wherein a travel decision group comprises a plurality of travel decisions that account for the one or more objects within the surrounding environment of the autonomous vehicle.

13. The computing system of claim 10, further comprising:
   determining that the travel decision is viable based on the scene data and a physical constraint associated with the autonomous vehicle; and
   generating the branching policy for the travel decision in response to the determination that the travel decision is viable.

14. An autonomous vehicle comprising:
   one or more processors; and
   one or more tangible, non-transitory, computer readable media that store instructions that when executed by the one or more processors cause the one or more processors to perform operations comprising:
      obtaining scene data descriptive of one or more objects within a surrounding environment of the autonomous vehicle;
      determining a plurality of subproblems based at least in part on the scene data, wherein a subproblem of the plurality of subproblems corresponds to a potential interaction of the autonomous vehicle with an object of the one or more objects within the surrounding environment of the autonomous vehicle, wherein the subproblem is associated with a precomputed solution comprising a function that governs the potential interaction;
      generating a branching policy based at least in part on the plurality of subproblems, wherein the branching policy comprises a plurality of nodes, and wherein a node of the plurality of nodes corresponds to a travel decision and is indicative of the potential interaction with the object in the surrounding environment of the autonomous vehicle;
      determining a cost for the branching policy using the precomputed solution associated with the subproblem;
      selecting the travel decision based at least in part on the cost for the branching policy; and
      initiating a motion of the autonomous vehicle based at least in part on the travel decision.

15. The autonomous vehicle of claim 14, wherein the scene data comprises state data for the one or more objects within the surrounding environment of the autonomous vehicle.

16. The autonomous vehicle of claim 15, wherein the state data for a respective object comprises data describing the respective object's location, speed, acceleration, heading, orientation, size, class, or status.

17. The autonomous vehicle of claim 16, further comprising:
   identifying one or more uncertainties associated with the scene data.

* * * * *